(12) United States Patent
Wang et al.

(10) Patent No.: US 11,989,260 B2
(45) Date of Patent: May 21, 2024

(54) DATA-SHARING SYSTEMS AND METHODS, WHICH USE MULTI-ANGLE INCENTIVE ALLOCATION

(71) Applicant: HUAWEI CLOUD COMPUTING TECHNOLOGIES CO., LTD., Gui'an New District (CN)

(72) Inventors: Chendi Wang, Vancouver (CA); Amin Banitalebi, Vancouver (CA); Lanjun Wang, Burnaby (CA); Yong Zhang, Richmond (CA)

(73) Assignee: HUAWEI CLOUD COMPUTING TECHNOLOGIES CO., LTD., Gui'an New District (CN)

( * ) Notice: Subject to any disclaimer, the term of this patent is extended or adjusted under 35 U.S.C. 154(b) by 411 days.

(21) Appl. No.: 17/363,871

(22) Filed: Jun. 30, 2021

(65) Prior Publication Data
US 2023/0015813 A1 Jan. 19, 2023

(51) Int. Cl.
G06N 20/00 (2019.01)
G06F 18/2113 (2023.01)
G06F 18/214 (2023.01)
G06F 18/23 (2023.01)

(52) U.S. Cl.
CPC ........ *G06F 18/214* (2023.01); *G06F 18/2113* (2023.01); *G06F 18/23* (2023.01); *G06N 20/00* (2019.01)

(58) Field of Classification Search
None
See application file for complete search history.

(56) References Cited

U.S. PATENT DOCUMENTS 10,339,147 B1 * 7/2019 Barmes ................. G06N 5/046
2019/0066133 A1 * 2/2019 Cotton ............... G06Q 30/0202

OTHER PUBLICATIONS

Jian Pei. "A Survey on Data Pricing: from Economics to Data Science." arXivpreprint arXiv:2009.04462 (2020).
Raul Castro Fernandez, Pranav Subramaniam, And Michael J. Franklin. "Data market platforms: Trading data assets to solve data problems." Proceedings of the VLDB Endowment 13.12 (2020): 1933-1947.
Ruoxi Jia, et al. "Towards efficient data valuation based on the shapley value." Xiv preprint arXiv: 1902.10275 (Aug. 2020).

(Continued)

*Primary Examiner* — Dov Popovici
(74) *Attorney, Agent, or Firm* — Locke Lord LLP; Tim Tingkang Xia, Esq.

(57) ABSTRACT

A data sharing system for sharing datasets of data providers to data consumers and transferring incentives from the data consumers to the data providers in response to the data-sharing. The system includes a multi-angle alliance guided data valuation module for fair allocation of the incentives between the data consumers. The system also includes a flexible-scenario routed dataset comparison module for evaluating the data provided by the data providers via one of a plurality of evaluating routes. The system provides enhanced use of computer cloud and enables both data alliance and growing capacity of artificial intelligence (AI) supermodels for sustainable data sharing. Moreover, the system uses coreset based Shapley valuation method for efficient data valuation.

23 Claims, 11 Drawing Sheets

(56) References Cited

OTHER PUBLICATIONS

Yu, Haifei, and Mengxiao Zhang. "Data pricing strategy based on data quality." Computers & Industrial Engineering 112 (2017): 1-10.
Judd Randolph Heckman et al. "A pricing model for data markets." iConference 2015 Proceedings (2015).
Jian Yang, Chongchong Zhao, and Chunxiao Xing. "Big data market optimization pricing model based on data quality." Complexity 2019 (2019).
Lloyd S. Shapley. "A value for n-person games." Contributions to the Theory of Games 2, No. 28 (1953): 307-317.
Pradeep Dubey. "On the uniqueness of the Shapley value." International Journal of Game Theory 4, No. 3 (1975): 131-139.
Amirata Ghorbani, and James Zou. "Data shapley: Equitable valuation of data for machine learning." arXiv preprint arXiv: 1904.02868 (2019).
Pang Wei Koh, and Percy Liang. "Understanding black-box predictions via influence functions." arXiv preprint arXiv: 1703.04730 (2017).
Sanjit A. Seshia, Ankush Desai, Tommaso Dreossi, Daniel J. Fremont, Shromona Ghosh, Edward Kim, Sumukh Shivakumar, Marcell Vazquez-Chanlatte, and Xiangyu [Yue. "Formal specification for deep neural networks." In International Symposium on Automated Technology for Verification and Analysis, pp. 20-34. Springer, Cham, 2018.
Venkat Gudivada, Amy Apon, and Junhua Ding. "Data quality considerations for big data and machine learning: Going beyond data cleaning and transformations." International Journal on Advances in Software 10.1 (2017): 1-20.
IBM autoAI playground: https://autoai.mybluemix.net/home.
Ulrik Brandes, Daniel Delling, Marco Gaertler, Robert Gorke, Martin Hoefer, Zoran Nikoloski, and Dorothea Wagner. "On finding graph clusterings with maximum modularity." In International Workshop on Graph-Theoretic Concepts in Computer Science, pp. 121-132. Springer, Berlin, Heidelberg, 2007.
S. Aranganayagi, and K. Thangavel. "Clustering categorical data using silhouette coefficient as a relocating measure." In International Conference on Computational Intelligence and Multimedia Applications (ICCIMA 2007), vol. 2, pp. 13-17. IEEE, 2007.
Dunn, Joseph C. "A fuzzy relative of the ISODATA process and its use in detecting compact well-separated clusters." (1973): 32-57.
Chen Sun, Abhinav Shrivastava, Saurabh Singh, and Abhinav Gupta. "Revisiting unreasonable effectiveness of data in deep learning era." In Proceedings of the IEEE International conference on computer vision, pp. 843-852. 2017.
Melissa A Schilling. "Understanding the alliance data." Strategic Management Journal 30, No. 3 (2009): 233-260.
Francine Berman, and Merce Crosas. "The research data alliance: Benefits and challenges of building a community organization." Harvard Data Science Review 2, No. 1 (2020).
Dario Amodei, Chris Olah, Jacob Steinhardt, Paul Christiano, John Schulman, and Dan Mane. "Concrete problems in AI safety." arXiv preprint arXiv: 1606.06565 (2016).
Ching-Yao Chuang, Antonio Torralba, and Stefanie Jegelka. "Estimating generalization under distribution shifts via domain-invariant representations." arXiv preprint arXiv:2007.03511 (2020).
Ibrahim Jubran, Alaa Maalouf, and Dan Feldman. "Introduction to coresets: Accurate coresets." arXiv preprint arXiv: 1910.08707 (2019).
Max Welling. "Herding dynamical weights to learn." Proceedings of the 26th Annual International Conference on Machine Learning. 2009.
Chaolun Xia, and Shanmugavelayutham Muthukrishnan. "Arbitrage-free pricing in user-based markets." In Proceedings of the 17th International Conference on Autonomous Agents and MultiAgent Systems, pp. 327-335. 2018.
Agarwal A, Dahleh M, Sarkar T. "A marketplace for data: An algorithmic solution." InProceedings of the 2019 ACM Conference on Economics and Computation Jun. 1, 20197 (pp. 701-726).

\* cited by examiner

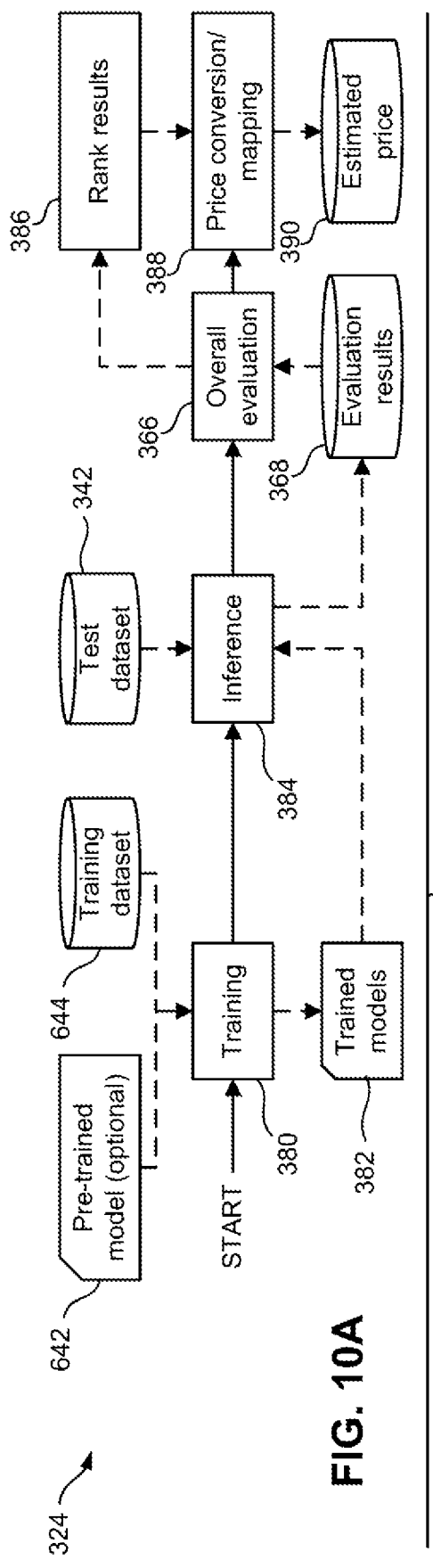
FIG. 10A
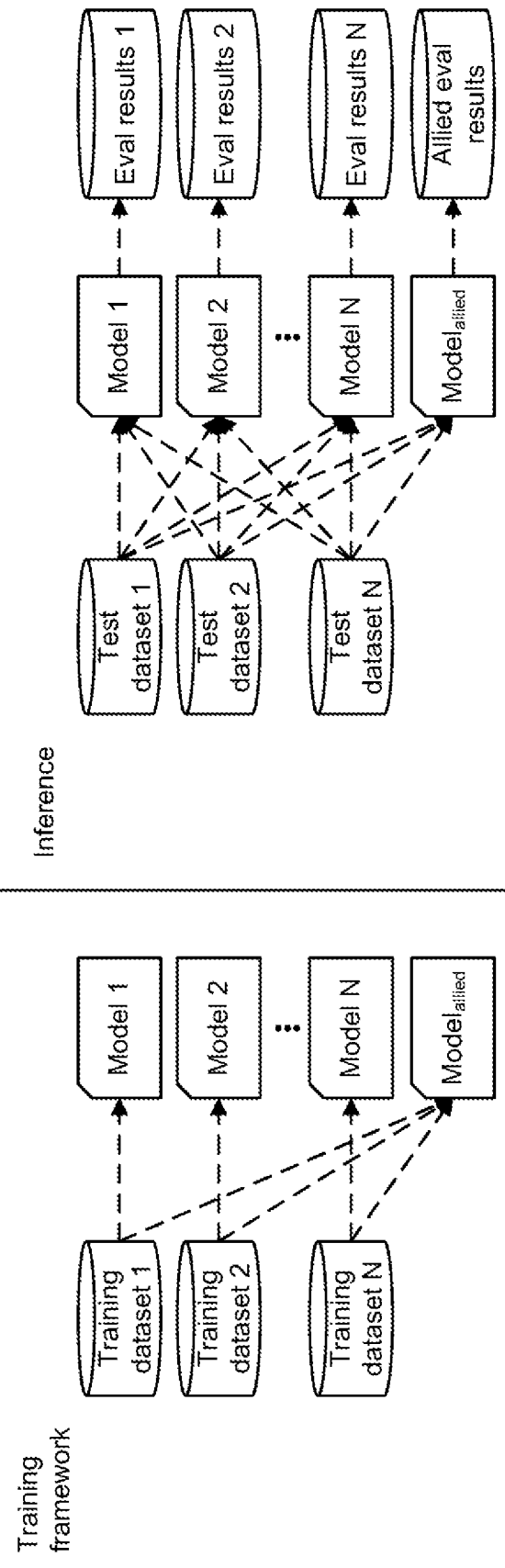
FIG. 10C
FIG. 10B

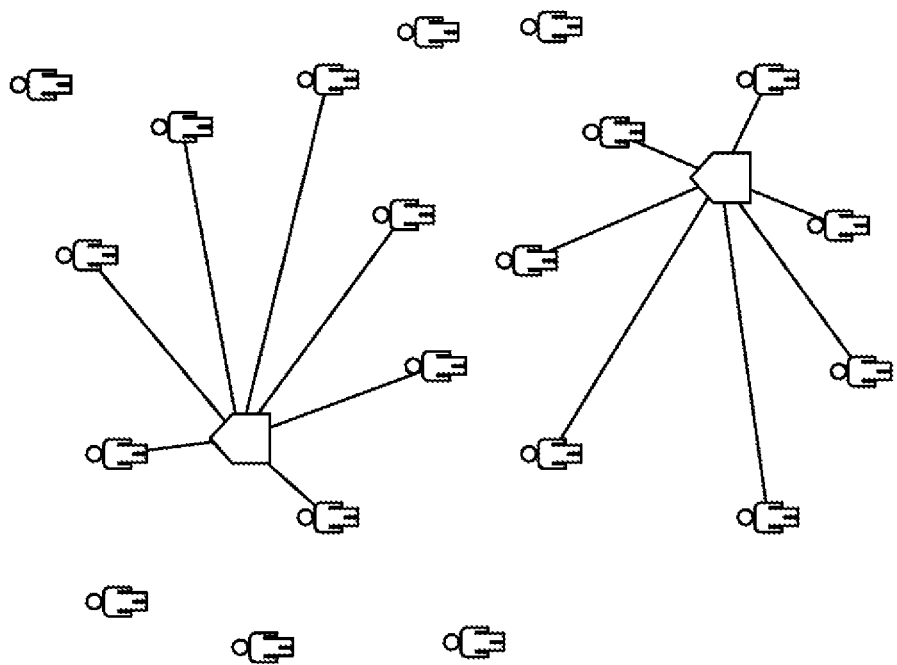

For each dataset there're multiple classes (Add clustering if unlabeled)

Input set $X = \{x_1, ..., x_n\}$ of class $y$

Input $m$ target number of core exemplars
($m$ may be determined by user input of a percentage of original data for each class)

require feature function $\varphi : X \to \mathbb{R}^d$ { task2vec if there is no supermodel, otherwise the last layer feature (option to use tSNE)

$\mu \leftarrow \frac{1}{n} \sum_{x \in X} \varphi(x)$ // current class mean for $k = 1, ..., m$ do $c_k \leftarrow \underset{x \in X}{\text{argmin}} \| \mu - \frac{1}{k} [\varphi(x) + \sum_{j=1}^{k-1} \varphi(c_j)] \|_r$ end for $C \leftarrow (c_1, ..., c_m)$ output Coreset $C$

FIG. 11

DATA-SHARING SYSTEMS AND METHODS, WHICH USE MULTI-ANGLE INCENTIVE ALLOCATION

FIELD OF THE DISCLOSURE

The present disclosure relates generally to data-sharing systems and methods, and in particular to data-sharing systems and methods which use multi-angle incentive allocation.

BACKGROUND

With the rapid growth of computer networks and in particular the Internet, data collection, data sharing, and data exchange have become important for computer-based data analysis. In the field of Artificial Intelligence, data analysis is sometimes called data mining. Data mining requires an extensive amount of data, sometimes called big data, to extract and discover patterns and correlations within the data.

One aspect of data-mining is data sharing wherein various parties may collect and accumulate big data via data sharing for training Artificial Intelligence (AI) models, which are in turn used for improving computer technologies in various areas. For example, there is a recent trend of using big data to train "supermodels" which may be used to boost the performance of downstream tasks. The supermodel model itself may also gain improvements by learning from more and more big data.

The parties involved in data sharing generally comprise data providers and data consumers. Herein, data providers share data with one or more data consumers and may receive incentives from the one or more data consumers. On the other hand, data consumers receive shared data from one or more data providers and may pay incentives for the shared data. Those skilled in the art will understand that a data provider in one case may be a data consumer in another case, and similarly a data consumer in one case may be a data provider in another case.

To facilitate data sharing, a computing system is used to link data providers and data consumers and to provide a mechanism such as a platform using necessary technologies for smoothly and securely transferring data received from data providers to data consumers. Moreover, a data-sharing system may also incentivize data providers to share their data. Hence, data-sharing systems with systematic and fair incentive allocations are desirable for incentivizing long-term sustainable data sharing.

SUMMARY

According to one aspect of this disclosure, there is provided data-sharing systems and methods for multi-angle incentive allocation via data valuation of a cloud-computing system. The data-sharing system disclosed herein comprises a user layer and an application layer. The application layer comprises a plurality of modules with improved functionalities, including a data-quality assurance module, a flexible-scenario routed dataset comparison module, and a multi-angle alliance guided data valuation module, with advanced usage of the cloud-computing system for deployment of trained AI models and for training AI supermodels.

Different from the existing systems, the data-sharing system disclosed herein provides improved effectiveness by using a plurality of system-level technical features and a plurality of method-level functional features, such as the data-quality assurance module, the flexible-scenario routed dataset comparison module, the multi-angle alliance guided data valuation module and a coreset based Shapley value computation that may significantly reduce the computation complexity (and thus significantly decrease the response time) of the data-sharing system.

In particular, the data-sharing system disclosed herein comprises a system-level software structure and method for incentive allocation with a number of functional modules, which surpasses the existing solutions in the ability to include more advanced and comprehensive aspects of data valuation of data provided by data providers, and smartly makes use of machine learning or Artificial Intelligence (AI) to reflect the value of the data of data providers for specific real-world tasks.

On the functional module level, the data-sharing system disclosed herein provides flexible-scenario analysis for dataset comparison, and thus takes into account different scenarios to best choose the valuation route to fit specific tasks, thereby solving the issue in the prior art wherein existing solutions mostly fail to evaluate the extrinsic properties of data such as the value that the data consumers truly care about. More specifically, the data-sharing system disclosed herein may flexibly execute AI-model training, data mining through clustering properties, or statistical property extraction for simple cases.

On the functional module level, the data-sharing system disclosed herein also features multi-angle alliance for data valuation, thereby allowing unique analysis of the contributions of data provided by the data providers from both individual data consumer's specific application scenario (which is intuitive and direct) and globally from the perspective of all data consumers' application scenarios. In contrary, existing data-sharing systems lack such perspective and thus may fail to enable a truly fair incentive allocation.

On the functional module level, the data-sharing system disclosed herein further uses computing resources (e.g. processing structure, controlling structures, and memory) of a cloud-computing system which enables both data alliance and the training of AI supermodels using data provided by multiple different data providers, thereby effectively fueling sustainable sharing of data.

Moreover, the data-sharing system disclosed herein uses a coreset-based efficient Shapley valuation method for effective valuation of data provided by data providers. The use of coreset-based efficient Shapley valuation method facilitates the computation of the value of the data provided by data providers with significant speed-up and deterministic approximation.

According to one aspect of this disclosure, there is provided a data sharing system for sharing data from one or more data providers to one or more data consumers, the data comprising one or more input datasets each provided by a respective one of the one or more data providers. The data sharing system comprises one or more processing structures; and memory storing instructions which, when executed by the one or more processing structures, cause the one or more processing structures to perform actions comprising: obtaining one or more training datasets from the one or more input datasets, each of the one or more training datasets corresponding to a respective one of the one or more input datasets; evaluating the one or more training datasets for generating one or more quality scores, each quality score associated with a respective one of the one or more training datasets; generating a unit value for each of the one or more input datasets based on the one or more quality scores;

receiving incentives from the one or more data consumers for acquiring at least a portion of the input datasets; distributing the received incentives to the one or more data providers based on the unit values and the at least portion of the input datasets; and sharing the at least portion of the input datasets with the one or more data consumers. Said evaluating the one or more datasets comprises: evaluating the one or more datasets using a first evaluation method comprising: training an artificial intelligence (AI) model using the one or more training datasets and a machine learning algorithm to obtain one or more first trained models, and generating each of the one or more quality scores based on one or more first predictions generated by a corresponding one of the one or more first trained models using one or more test datasets received from the one or more data consumers.

In some embodiments, said generating each of the one or more quality scores comprises: calculating one or more first performance metrics based on the one or more first predictions generated by the corresponding one of the one or more first trained models using the one or more test datasets, each of the one or more first performance metrics corresponding to a respective one of the one or more test datasets; calculating a first score for the corresponding one of the one or more first trained models, the first score being a weighted summation of the one or more first performance metrics; and calculating the one or more quality scores using at least the one or more first scores.

In some embodiments, said evaluating the one or more training datasets comprises: aggregating different subsets of the one or more training datasets to form a plurality of aggregated training datasets; training the AI model using the aggregated training datasets to obtain a plurality of second trained models; and generating each of the one or more quality scores based on the one or more first predictions generated by the corresponding one of the one or more first trained models using the one or more test datasets and a plurality of second predictions generated by the second trained models using the one or more test datasets.

In some embodiments, said generating each of the one or more quality scores comprises: calculating one or more first performance metrics based on the one or more first predictions generated by the corresponding one of the one or more first trained models using the one or more test datasets, each of the one or more first performance metrics corresponding to a respective one of the one or more test datasets; calculating a first score for the corresponding one of the one or more first trained models, the first score being a weighted summation of the one or more first performance metrics; calculating a plurality of second performance metrics based on the predictions generated by the second trained models using the one or more test datasets, for each of the second trained models, each of the second performance metrics corresponding to a respective one of the one or more test datasets; combining the second evaluation metrics to produce a second score for each of the one or more training datasets; and calculating each of the one or more quality scores as weighted summation of a corresponding one of the first scores and a corresponding one of the second scores.

In some embodiments, said calculating the plurality of second performance metrics comprises: calculating the plurality of second performance metrics using a Shapley value method based on the predictions generated by the second trained models using the one or more test datasets, for each of the second trained models.

In some embodiments, said generating the unit value for each of the one or more input datasets based on the one or more quality scores comprises: ranking the one or more quality scores; and producing the unit values for the one or more input datasets based on the ranking.

In some embodiments, the instructions, when executed by the one or more processing structures, cause the one or more processing structures to perform further actions comprising: receiving one or more raw input datasets from the one or more data providers; and said obtaining the one or more training datasets from the one or more input datasets comprises: filtering the one or more raw input datasets to obtain the one or more training datasets.

In some embodiments, said obtaining the one or more training datasets from the one or more input datasets comprises: constructing a coreset from each of the one or more input datasets to obtain the one or more training datasets.

In some embodiments, wherein said constructing the coreset from each of the one or more input datasets comprises: constructing the coreset from each of the one or more input datasets using a herding method.

In some embodiments, said evaluating the one or more datasets comprises: evaluating the one or more datasets using a plurality of evaluation methods, the plurality of evaluation methods comprising the first evaluation method; and the instructions, when executed by the one or more processing structures, cause the one or more processing structures to perform further actions comprising: selecting the first evaluation method when an input from the one or more data consumers comprises one or more task definitions associated with a target task and the one or more test datasets are associated with the target task.

In some embodiments, the plurality of predefined evaluation methods comprise a second evaluation method, the second evaluation method comprising: an automated clustering function for estimating clusterability of the one or more training datasets, clustering the one or more training datasets, and estimating the number of clusters, and a clustering evaluation function for computing clustering outcome metrics to measure intra-class and inter-class relationships of the clusters and to generate the one or more quality scores; the instructions, when executed by the one or more processing structures, cause the one or more processing structures to perform further actions comprising: selecting the second evaluation method when the input from the one or more data consumers comprises no task definitions.

In some embodiments, the intra-class and inter-class relationships of the clusters comprise one or more of modularity, silhouette coefficient, Dunn index, and Davies-Bouldin index.

In some embodiments, the plurality of predefined evaluation methods comprise a third evaluation method, the third evaluation method comprising: a statistics extraction function for extracting statistics of the one or more training datasets with respect to one or more features thereof, and a statistics score computation function for using the extracted statistics to generate the one or more quality scores; the instructions, when executed by the one or more processing structures, cause the one or more processing structures to perform further actions comprising: selecting the third evaluation method when the one or more input datasets are associated with a first task, the input from the one or more data consumers comprises the one or more task definitions associated with the target task, and the first task matches the target task.

In some embodiments, the one or more features comprise one or more of volume, distribution, and image quality metrics.

In some embodiments, each of the one or more quality scores is calculated as a weighted sum of the volume, the distribution, and the image quality metrics, with a summation of weights of the volume, the distribution, and the image quality metrics equals to one.

In some embodiments, the data sharing system further comprises: a computer cloud for maintaining an AI supermodel for use in said evaluating the one or more training datasets for generating the one or more quality scores, the AI supermodel being trained using the one or more training datasets and other training datasets provided by other data providers.

According to one aspect of this disclosure, there is provided a computerized method for sharing data from one or more data providers to one or more data consumers, the data comprising one or more input datasets each provided by a respective one of the one or more data providers. The method comprises: obtaining one or more training datasets from the one or more input datasets, each of the one or more training datasets corresponding to a respective one of the one or more input datasets; evaluating the one or more training datasets for generating one or more quality scores, each quality score associated with a respective one of the one or more training datasets; generating a unit value for each of the one or more input datasets based on the one or more quality scores; receiving incentives from the one or more data consumers for acquiring at least a portion of the input datasets; distributing the received incentives to the one or more data providers based on the unit values and the at least portion of the input datasets; and sharing the at least portion of the input datasets with the one or more data consumers. Said evaluating the one or more datasets comprises: evaluating the one or more datasets using a first evaluation method comprising: training an artificial intelligence (AI) model using the one or more training datasets and a machine learning algorithm to obtain one or more first trained models, and generating each of the one or more quality scores based on one or more first predictions generated by a corresponding one of the one or more first trained models using one or more test datasets received from the one or more data consumers.

In some embodiments, said generating each of the one or more quality scores comprises: calculating one or more first performance metrics based on the one or more first predictions generated by the corresponding one of the one or more first trained models using the one or more test datasets, each of the one or more first performance metrics corresponding to a respective one of the one or more test datasets; calculating a first score for the corresponding one of the one or more first trained models, the first score being a weighted summation of the one or more first performance metrics; and calculating the one or more quality scores using at least the one or more first scores.

In some embodiments, said evaluating the one or more training datasets comprises: aggregating different subsets of the one or more training datasets to form a plurality of aggregated training datasets; training the AI model using the aggregated training datasets to obtain a plurality of second trained models; and generating each of the one or more quality scores based on the one or more first predictions generated by the corresponding one of the one or more first trained models using the one or more test datasets and a plurality of second predictions generated by the second trained models using the one or more test datasets.

In some embodiments, said obtaining the one or more training datasets from the one or more input datasets comprises: constructing a coreset from each of the one or more input datasets to obtain the one or more training datasets.

In some embodiments, said evaluating the one or more datasets comprises: evaluating the one or more datasets using a plurality of evaluation methods, the plurality of evaluation methods comprising the first evaluation method; and the computerized method further comprises: selecting the first evaluation method when an input from the one or more data consumers comprises one or more task definitions associated with a target task and the one or more test datasets are associated with the target task.

According to one aspect of this disclosure, there is provided one or more non-transitory computer-readable storage devices comprising computer-executable instructions for sharing data from one or more data providers to one or more data consumers, the data comprising one or more input datasets each provided by a respective one of the one or more data providers. The instructions, when executed, cause one or more processors to perform actions comprising: obtaining one or more training datasets from the one or more input datasets, each of the one or more training datasets corresponding to a respective one of the one or more input datasets; evaluating the one or more training datasets for generating one or more quality scores, each quality score associated with a respective one of the one or more training datasets; generating a unit value for each of the one or more input datasets based on the one or more quality scores; receiving incentives from the one or more data consumers for acquiring at least a portion of the input datasets; distributing the received incentives to the one or more data providers based on the unit values and the at least portion of the input datasets; and sharing the at least portion of the input datasets with the one or more data consumers. Said evaluating the one or more datasets comprises: evaluating the one or more datasets using a first evaluation method comprising: training an artificial intelligence (AI) model using the one or more training datasets and a machine learning algorithm to obtain one or more first trained models, and generating each of the one or more quality scores based on one or more first predictions generated by a corresponding one of the one or more first trained models using one or more test datasets received from the one or more data consumers.

In some embodiments, said generating each of the one or more quality scores comprises: calculating one or more first performance metrics based on the one or more first predictions generated by the corresponding one of the one or more first trained models using the one or more test datasets, each of the one or more first performance metrics corresponding to a respective one of the one or more test datasets; calculating a first score for the corresponding one of the one or more first trained models, the first score being a weighted summation of the one or more first performance metrics; and calculating the one or more quality scores using at least the one or more first scores.

BRIEF DESCRIPTION OF THE DRAWINGS

FIG. 5 is a schematic diagram showing the dataflow of the data-sharing system shown in

FIG. 1;

FIGS. 10A to 10C are schematic diagrams showing the workflow of the multi-angle alliance guided data valuation module of the data-sharing system shown in FIG. 6;

FIG. 11 shows a piece of pseudo codes of a herding algorithm used by the data-sharing system shown in FIG. 6;

DETAILED DESCRIPTION

For ease of reading, subsection N of the Detailed Description lists the definitions of some terms used in this disclosure, and subsection O lists the references cited in this disclosure.

A. Data-Sharing System: Hardware and Software Structures

Figure 1:
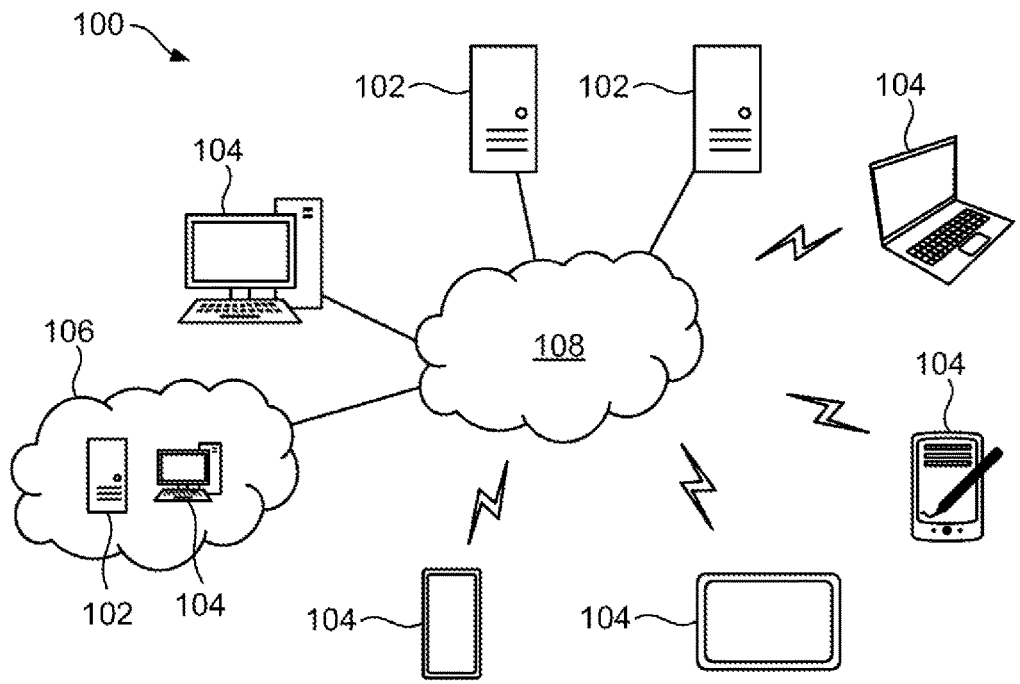
FIG. 1 is a schematic diagram of a data-sharing system for data sharing, according to some embodiments of this disclosure.

Turning now to FIG. 1, a computer network system for data sharing (denoted a "data-sharing system" hereinafter) is shown and is generally identified using reference numeral 100. As shown, the data-sharing system 100 comprises one or more server computers 102, a plurality of client computing devices 104, and one or more client computer systems 106 functionally interconnected by a network 108, such as the Internet, a local area network (LAN), a wide area network (WAN), a metropolitan area network (MAN), and/or the like, via suitable wired and wireless networking connections. As those skilled in the art will appreciate, the data-sharing system 100 in some embodiments may be a local network system within a company, an organization, and/or the like and used by limited number of users thereof. In some other embodiments, the data-sharing system 100 may leverage the Internet and may be a cloud-computing system (see the definition of "cloud" in subsection N).

The server computers 102 may be computing devices designed specifically for use as a server, and/or general-purpose computing devices acting server computers while also being used by various users. Each server computer 102 may execute one or more server programs.

The client computing devices 104 may be portable and/or non-portable computing devices such as laptop computers, tablets, smartphones, Personal Digital Assistants (PDAs), desktop computers, and/or the like, used by data providers and data consumers. Each client computing devices 104 may execute one or more client application programs which sometimes may be called "apps".

Herein, a data provider is an entity (for example, an individual user, an organization, or the like) providing a set of data (denoted a "dataset" which comprises one or more data elements or data samples) for sharing with one or more data consumers, and a data consumer is an entity receiving and using at least a portion of the data provided by one or more data providers. A data consumer may provide incentives to the data providers who shared the data to the data consumer. The incentives may be any suitable rewards such as monetary rewards, credits, increased user levels in a user structure, access to additional resources (such as access to additional virtual equipment in a computer game, access to additional books and articles in a knowledgebase, and/or the like) in a structured resource system, and/or the like. The incentive transferred from a data consumer to a data provider may be determined based on the amount of the data shared from the data provider to the data consumer, and a unit value of the data determined by the data-sharing system 100 (described in more detail later).

The client computer system 106 may be a computer network system used by a data provider or a data consumer, and may comprise its own server computers and client computing devices (also identified using reference numerals 102 and 104, respectively).

Figure 2:
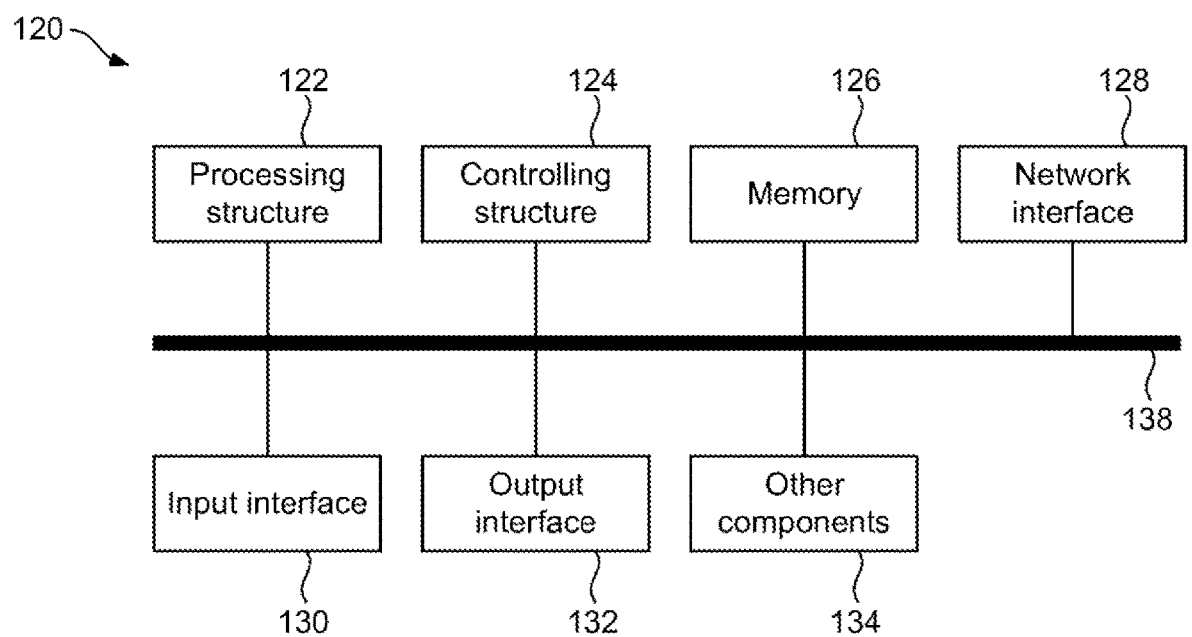
FIG. 2 is a schematic diagram showing a simplified hardware structure of a computing device of the data-sharing system shown in FIG. 1.

Generally, the computing devices 102 and 104 comprise similar hardware structures such as hardware structure 120 shown in FIG. 2. As shown, the hardware structure 120 comprises a processing structure 122, a controlling structure 124, one or more non-transitory computer-readable memory or storage devices 126, a network interface 128, an input interface 130, and an output interface 132, functionally interconnected by a system bus 138. The hardware structure 120 may also comprise other components 134 coupled to the system bus 138.

The processing structure 122 may be one or more single-core or multiple-core computing processors, generally referred to as central processing units (CPUs), such as INTEL® microprocessors (INTEL is a registered trademark of Intel Corp., Santa Clara, CA, USA), AMD® microprocessors (AMD is a registered trademark of Advanced Micro Devices Inc., Sunnyvale, CA, USA), ARM° microprocessors (ARM is a registered trademark of Arm Ltd., Cambridge, UK) manufactured by a variety of manufactures such as Qualcomm of San Diego, California, USA, under the ARM® architecture, or the like. When the processing structure 122 comprises a plurality of processors, the processors thereof may collaborate via a specialized circuit such as a specialized bus or via the system bus 138.

The processing structure 122 may also comprise one or more real-time processors, programmable logic controllers (PLCs), microcontroller units (MCUs), µ-controllers (UCs), specialized/customized processors, hardware accelerators, and/or controlling circuits (also denoted "controllers") using, for example, field-programmable gate array (FPGA) or application-specific integrated circuit (ASIC) technologies, and/or the like. In some embodiments, the processing structure includes a CPU (otherwise referred to as a host processor) and a specialized hardware accelerator which includes circuitry configured to perform computations of neural networks such as tensor multiplication, matrix multiplication, and the like. The host processor may offload computations to a to the hardware accelerator to perform computation operations of neural network, Examples of a hardware accelerator include a graphics processing unit (GPU), Neural Processing Unit (NPU), and Tensor Process Unit (TPU).

Generally, each processor of the processing structure 122 comprises necessary circuitries implemented using technologies such as electrical and/or optical hardware components for executing one or more processes, as the implementation purpose and/or the use case maybe, to perform various tasks.

For example, each processor of the processing structure 122 may comprise logic gates implemented by semiconductors to perform various computations, calculations, operations, and/or processings. Examples of logic gates include AND gate, OR gate, XOR (exclusive OR) gate, and NOT gate, each of which takes one or more inputs and generates or otherwise produces an output therefrom based on the logic implemented therein. For example, a NOT gate receives an input (for example, a high voltage, a state with electrical current, a state with an emitted light, or the like), inverts the input (for example, forming a low voltage, a state with no electrical current, a state with no light, or the like), and output the inverted input as the output.

While the inputs and outputs of the logic gates are generally physical signals and the logics or processings thereof are tangible operations with physical results (for example, outputs of physical signals), the inputs and outputs thereof are generally described using numerals (for example, numerals "0" and "1") and the operations thereof are generally described as "computing" (which is how the "computer" or "computing device" is named) or "calculation", or more generally, "processing", for generating or producing the outputs from the inputs thereof.

Sophisticated combinations of logic gates in the form of a circuitry of logic gates, such as the one or more processors of the processing structure 122, may be formed using a plurality of AND, OR, XOR, and/or NOT gates. Such combinations of logic gates may be implemented using individual semiconductors, or more often be implemented as integrated circuits (ICs).

A circuitry of logic gates may be "hard-wired" circuitry which, once designed, may only perform the designed tasks. In this example, the tasks thereof are "hard-coded" in the circuitry.

With the advance of technologies, it is often that a circuitry of logic gates, such as the one or more processors of the processing structure 122, may be alternatively designed in a general manner so that it may perform various tasks according to a set of "programmed" instructions implemented as firmware and/or software and stored in one or more non-transitory computer-readable storage devices or media. In this example, the circuitry of logic gates, such as the one or more processors of the processing structure 122, is usually of no use without meaningful firmware and/or software.

Of course, those skilled the art will appreciate that a processor may be implemented using other technologies such as analog technologies.

The controlling structure 124 comprises one or more controlling circuits, such as graphic controllers, input/output chipsets and the like, for coordinating operations of various hardware components and modules of the computing device 102/104.

The memory 126 comprises one or more storage devices or media accessible by the processing structure 122 and the controlling structure 124 for reading and/or storing instructions for the processing structure 122 to execute, and for reading and/or storing data, including input data and data generated by the processing structure 122 and the controlling structure 124. The memory 126 may be volatile and/or non-volatile, non-removable or removable memory such as RAM, ROM, EEPROM, solid-state memory, hard disks, CD, DVD, flash memory, or the like. In use, the memory 126 is generally divided into a plurality of portions for different use purposes. For example, a portion of the memory 126 (denoted as storage memory herein) may be used for long-term data storing, for example, for storing files or databases. Another portion of the memory 126 may be used as the system memory for storing data during processing (denoted as working memory herein).

The network interface 128 comprises one or more network modules for connecting to other computing devices or networks through the network 108 by using suitable wired or wireless communication technologies such as Ethernet, WI-FI® (WI-FI is a registered trademark of Wi-Fi Alliance, Austin, TX, USA), BLUETOOTH® (BLUETOOTH is a registered trademark of Bluetooth Sig Inc., Kirkland, WA, USA), Bluetooth Low Energy (BLE), Z-Wave, Long Range (LoRa), ZIGBEE® (ZIGBEE is a registered trademark of ZigBee Alliance Corp., San Ramon, CA, USA), wireless broadband communication technologies such as Global System for Mobile Communications (GSM), Code Division Multiple Access (CDMA), Universal Mobile Telecommunications System (UMTS), Worldwide Interoperability for Microwave Access (WiMAX), CDMA2000, Long Term Evolution (LTE), 3GPP, 5G New Radio (5G NR) and/or other 5G networks, and/or the like. In some embodiments, parallel ports, serial ports, USB connections, optical connections, or the like may also be used for connecting other computing devices or networks although they are usually considered as input/output interfaces for connecting input/output devices.

The input interface 130 comprises one or more input modules for one or more users to input data via, for example, touch-sensitive screen, touch-sensitive whiteboard, touch-pad, keyboards, computer mouse, trackball, microphone, scanners, cameras, and/or the like. The input interface 130 may be a physically integrated part of the computing device 102/104 (for example, the touch-pad of a laptop computer or the touch-sensitive screen of a tablet), or may be a device physically separate from, but functionally coupled to, other components of the computing device 102/104 (for example, a computer mouse). The input interface 130, in some implementation, may be integrated with a display output to form a touch-sensitive screen or touch-sensitive whiteboard.

The output interface 132 comprises one or more output modules for output data to a user. Examples of the output modules comprise displays (such as monitors, LCD displays, LED displays, projectors, and the like), speakers, printers, virtual reality (VR) headsets, augmented reality (AR) goggles, and/or the like. The output interface 132 may be a physically integrated part of the computing device 102/104 (for example, the display of a laptop computer or tablet), or may be a device physically separate from but functionally coupled to other components of the computing device 102/104 (for example, the monitor of a desktop computer).

The computing device 102/104 may also comprise other components 134 such as one or more positioning modules, temperature sensors, barometers, inertial measurement unit (IMU), and/or the like. Examples of the positioning modules may be one or more global navigation satellite system (GNSS) components (e.g., one or more components for operation with the Global Positioning System (GPS) of USA, Global'naya Navigatsionnaya Sputnikovaya Sistema (GLONASS) of Russia, the Galileo positioning system of the European Union, and/or the Beidou system of China).

The system bus 138 interconnects various components 122 to 134 enabling them to transmit and receive data and control signals to and from each other.

From the computer point of view, the computing device 102/104 may comprise a plurality of modules. Herein, a "module" is a term of explanation referring to a hardware structure such as a circuitry implemented using technologies such as electrical and/or optical technologies (and with more specific examples of semiconductors) for performing defined operations or processings. A "module" may alternatively refer to the combination of a hardware structure and a software structure, wherein the hardware structure may be implemented using technologies such as electrical and/or optical technologies (and with more specific examples of semiconductors) in a general manner for performing defined operations or processings according to the software structure in the form of a set of instructions stored in one or more non-transitory, computer-readable storage devices or media.

As a part of a device, an apparatus, a system, and/or the like, a module may be coupled to or integrated with other parts of the device, apparatus, or system such that the combination thereof forms the device, apparatus, or system. Alternatively, the module may be implemented as a stand-alone device or apparatus.

Figure 3:
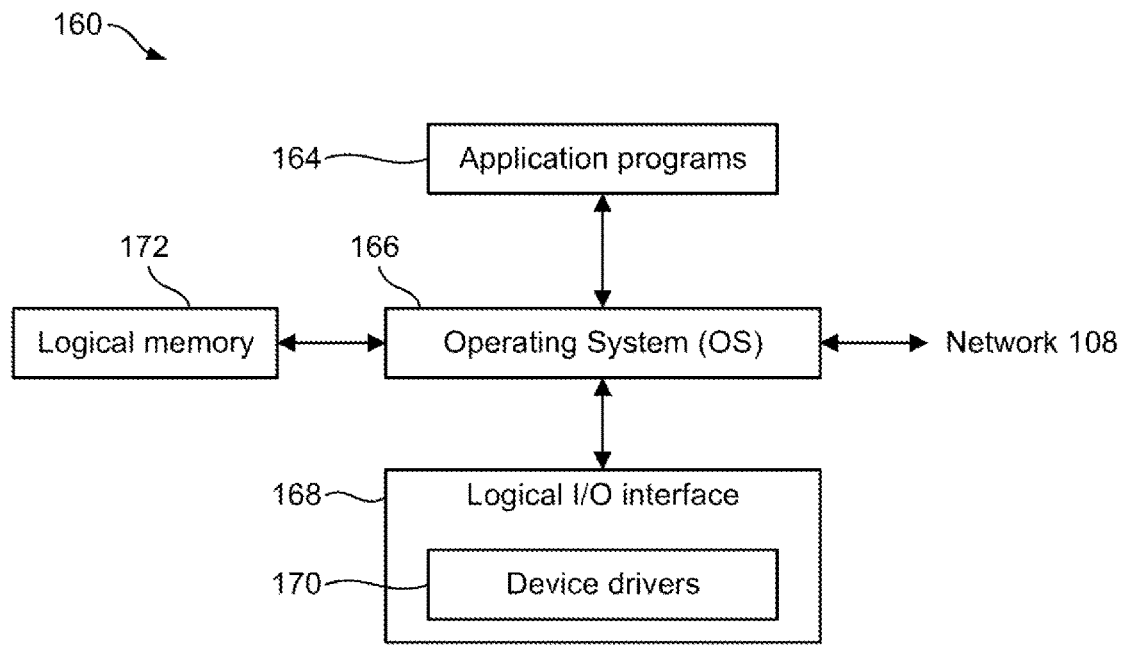
FIG. 3 a schematic diagram showing a simplified software architecture of a computing device of the data-sharing system shown in FIG. 1.

FIG. 3 shows a simplified software architecture 160 of the computing device 102 or 104. The software architecture 160 comprises one or more application programs 164, an operating system 166, a logical input/output (I/O) interface 168, and a logical memory 172. The one or more application programs 164, operating system 166, and logical I/O interface 168 are generally implemented as computer-executable instructions or code in the form of software programs or firmware programs stored in the logical memory 172 which may be executed by the processing structure 122.

Herein, a software or firmware program is a set of computer-executable instructions or code stored in one or more non-transitory computer-readable storage devices or media such as the memory 126, and may be read and executed by the processing structure 122 and/or other suitable components of the computing device 102/104 for performing one or more processes. Those skilled in the art will appreciate that a program may be implemented as either software or firmware, depending on the implementation purposes and requirements. Therefore, for ease of description, the terms "software" and "firmware" may be interchangeably used hereinafter.

Herein, a process has a general meaning equivalent to that of a method, and does not necessarily correspond to the concept of computing process (which is the instance of a computer program being executed). More specifically, a process herein is a defined method implemented as software or firmware programs executable by hardware components for processing data (such as data received from users, other computing devices, other components of the computing device 102/104, and/or the like). A process may comprise or use one or more functions for processing data as designed. Herein, a function is a defined sub-process or sub-method for computing, calculating, or otherwise processing input data in a defined manner and generating or otherwise producing output data.

Alternatively, a process may be implemented as one or more hardware structures having necessary electrical and/or optical components, circuits, logic gates, integrated circuit (IC) chips, and/or the like.

Referring back to FIG. 3, the one or more application programs 164 executed by or run by the processing structure 122 for performing various tasks.

The operating system 166 manages various hardware components of the computing device 102 or 104 via the logical I/O interface 168, manages the logical memory 172, and manages and supports the application programs 164. The operating system 166 is also in communication with other computing devices (not shown) via the network 108 to allow application programs 164 to communicate with those running on other computing devices. As those skilled in the art will appreciate, the operating system 166 may be any suitable operating system such as MICROSOFT® WINDOWS® (MICROSOFT and WINDOWS are registered trademarks of the Microsoft Corp., Redmond, WA, USA), APPLE® OS X, APPLE® iOS (APPLE is a registered trademark of Apple Inc., Cupertino, CA, USA), Linux, ANDROID® (ANDROID is a registered trademark of Google LLC, Mountain View, CA, USA), or the like. The computing devices 102 and 104 of the data-sharing system 100 may all have the same operating system, or may have different operating systems.

The logical I/O interface 168 comprises one or more device drivers 170 for communicating with respective input and output interfaces 130 and 132 for receiving data therefrom and sending data thereto. Received data may be sent to the one or more application programs 164 for being processed by one or more application programs 164. Data generated by the application programs 164 may be sent to the logical I/O interface 168 for outputting to various output devices (via the output interface 132).

The logical memory 172 is a logical mapping of the physical memory 126 for facilitating the application programs 164 to access. In this embodiment, the logical memory 172 comprises a storage memory area that may be mapped to a non-volatile physical memory such as hard disks, solid-state disks, flash drives, and the like, generally for long-term data storage therein. The logical memory 172 also comprises a working memory area that is generally mapped to high-speed, and in some implementations volatile, physical memory such as RAM, generally for application programs 164 to temporarily store data during program execution. For example, an application program 164 may load data from the storage memory area into the working memory area, and may store data generated during its execution into the working memory area. The application program 164 may also store some data into the storage memory area as required or in response to a user's command.

In a server computer 102, the one or more application programs 164 generally provide server functions for managing network communication with client computing devices 104 and facilitating collaboration between the server computer 102 and the client computing devices 104. Herein, the term "server" may refer to a server computer 102 from a hardware point of view or a logical server from a software point of view, depending on the context.

As described above, the processing structure 122 is usually of no use without meaningful firmware and/or software. Similarly, while a computer system such as the data-sharing 100 may have the potential to perform various tasks, it cannot perform any tasks and is of no use without meaningful firmware and/or software. As will be described in more detail later, the data-sharing system 100 described herein, as a combination of hardware and software, generally produces tangible results tied to the physical world, wherein the tangible results such as those described herein may lead to improvements to the computer and system themselves.

B. Data-Sharing System: Overview

As those skilled in the art will appreciate, in artificial intelligence (AI) based and/or data-analysis systems (such as systems of data consumers 204), data is a valuable asset. As described in the BACKGROUND section, AI-based computing devices, systems, and methods require big data, and the accumulation of data from various sources to obtain big data requires data-sharing systems and methods. Therefore, data-sharing systems and methods are a critical and integrated part of any AI-based computer systems and/or AI-based data-analysis systems, and more broadly, a critical and integrated part of any data-analysis systems. In other words, the success of AI-based computer systems and/or data-analysis systems rely on the success of data-sharing systems and methods.

Figure 4:
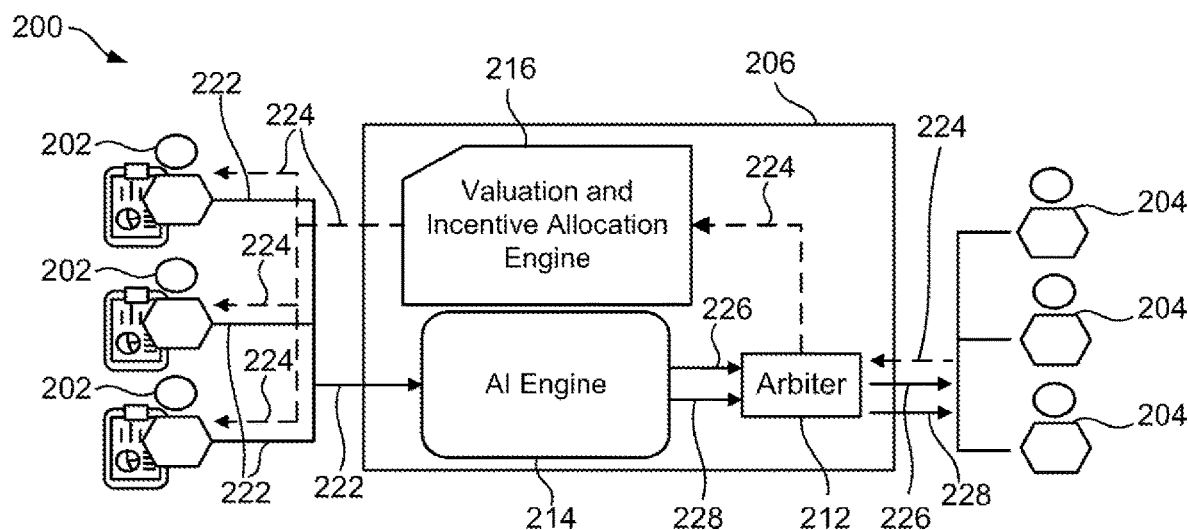
FIG. 4 is a schematic diagram showing a functional structure of the data-sharing system shown in FIG. 1.

FIG. 4 is a schematic diagram showing the functional structure 200 of the data-sharing system 100. As described above, the data-sharing system 100 is a combination of hardware and software. Therefore, the functional components shown in FIG. 4 may be implemented as software, hardware, or a combination thereof in various embodiments, as the implementation purposes and system requirements may be. When implemented as software, the functional components shown in FIG. 4 may be implemented as one or more application programs 164 (see FIG. 3) that includes various software components, modules, and/or engines. Such that software components, modules, and/or engines may include computer-readable instructions stored in one or more non-transitory computer-readable storage devices or media and executable by the one or more processors 122 of the one or more computer servers 102 (see FIGS. 1 and 2). In some embodiments, the functional components shown in FIG. 4 may be provided as a service (for example, as part of a software-as-a-service (SaaS) or part of a platform-as-a-service, such as a machine-learning-as-a-service (MLaaS)) to the data providers 202 and the data consumers 204 to incentivize the sharing of data therebetween.

In these embodiments, the data-sharing system 100 may be a data-sharing platform running a data-sharing service 206 in the one or more server computers 102 (for example, as one or more application programs implemented as software, firmware, hardware, or a combination thereof) to link various users including data providers 202 who use their client computing devices and/or client computer systems (not shown) to provide data for sharing and data consumers 204 who use their client computing devices and/or client computer systems (not shown) to acquire at least a portion of shared data from one or more data providers 202 and transfer incentives thereto for the acquired data. In various embodiments, a data consumer 204 may transfer the incentives to a data provider 202 before acquiring data therefrom (and the acquisition of data may occur immediately after the transfer of incentives or after a moderate or relatively long time period since the transfer of incentives), or may transfer the incentives to the data provider 202 after acquiring data therefrom.

The data-sharing service 206 comprises an arbiter or service provider 212, an AI engine 214 for training an AI model 228 (resulting in a plurality of trained AI models each corresponding to the dataset of a respective data provider 202) and evaluating the value of the unprocessed or raw data 222 provided by the data providers 202, and a valuation and incentive allocation engine 216 for computing and distributing incentives 224 (received from data consumers 204) among the data providers 202. The arbiter 212 also provides processed data 226 to data consumers 204. The arbiter 212 may further provide the trained AI models 228 as a service to the data consumers 204. As those skilled in the art will appreciate, data consumers 204 may also be data providers 202. Therefore, providing the trained AI models 228 which performs a given inference task to the data consumers 204 may further motivate the data consumers 204 to act as data providers as they benefit from using the improved trained AI models 228.

In some embodiments, an AI model 228 may refer to an AI model trained using a dataset obtained by the data-sharing service 206 of the data-sharing system 100. In practice, there may exist a plurality of data-sharing systems (which may or may not have the same structure as the data-sharing system 100 disclosed herein) operated by various entities, each of which may comprise its own AI models trained by their own datasets. In some embodiments, the plurality of data providers 202 of the data-sharing system 100 and/or a plurality of data-sharing systems may form a data alliance with an AI model (denoted a "supermodel") trained using the datasets and/or AI models of the data-sharing systems of the data alliance. In these embodiments, the AI model 228 may be a supermodel.

As those skilled in the art will appreciate, different data may have different values. For example, if the unprocessed data is an image with a low resolution or poor quality, the valuation and incentive allocation module generally assigns a low value to the unprocessed data, while an image related to a breaking news may be assigned a much higher value even though its quality is poor.

As described above, incentives may be determined and transferred from a data consumer 204 to a data provider 202 based on the value of the data that the data consumer 204 acquired from the data provider 202 (and also determined based on the amount of acquired data). Accordingly, incentive allocation and data valuation engine 214 may be defined as follows.

Consider that the data-sharing service 206 use a function $f(\ )$ to create a mashup m from datasets d1, d2, and d3 from data providers s1, s2, s3, respectively. Herein a mashup m or a data mashup is the integration of a plurality of datasets. An incentive allocation function determines how much of the incentive raised by sharing m (data mashup/fusion) is allocated to the data that led to m (see Reference R2).

Next, a data valuation function is defined (see Reference R3). Consider a fused dataset $D=\{Z_i\}_{i=1}^N$ containing datasets from N data providers 202. Let U(S) be the utility function representing the value calculated by the additive aggregation of $\{Z_i\}_{i \in S}$ and $S \subseteq I = \{1, \ldots, N\}$. Without loss of generality, assume throughout that $U(\emptyset)=0$, where $\emptyset$ represent a null or empty set. The goal is to partition $U_{tot} \triangleq U(I)$, the utility of the entire fused dataset, to the individual data providers 202 of the entire fused dataset; more formally, to find a function that assigns to the i-th data provider $202_i$ a number s(U, i) for a given utility function U (see Reference R3). For example, a utility function U may be used to define the performance gain of an AI model, compared to a random predictor.

The core for a fair and accurate incentive allocation method is dependent on a data valuation method that may reflect the data's usefulness to the target task of the data consumer 204. There are two methods to reflect the dataset's usefulness to the target task of the data consumer 204. One method (denoted a "dataset-as-base-unit" method) is to take each dataset as a base unit and evaluate the contribution in improving the performance of the trained AI model 228 using the entirety of a dataset, and the other method is to evaluate the contribution of each data point (that is, each data element or data sample of the dataset) as a base unit in improving the performance of the trained AI model 228, and then aggregate the point-wise contribution to a whole dataset. Either way, the goal is to find a function that assigns to the i-th data provider $202_i$ a number (U, i) for a given utility function U(S) and a fused dataset $D=\{Z_{ij}\}_{i=1}^{N}$ containing data points of datasets from different data providers. U(S) represents the value calculated by the additive aggregation of $\{Z_{ij}\}_{i \in S}$ and $S \subseteq I=\{1, \ldots, N\}$, and $U_{tot} \triangleq U(I)$ represents the utility of the entire fused dataset.

Shapley value (SV) from cooperative game theory field (see Reference R7) is a desirable candidate for the data valuation task since it is a unique value that satisfies equitable valuation condition (see Reference R8) by possessing three properties of group rationality, symmetry, and additivity (see Reference R3). Mathematically, SV is defined as the average marginal contribution of $z_i$ to all possible subsets of $D=\{Z_{ij}\}_{i \in I}$:

$$S_i = \sum_{S \subseteq I \setminus \{i\}} \frac{1}{N \binom{N-1}{|S|}} [U(S \cup \{i\}) - U(S)] \quad (1)$$

In other words, SV determines the fair share to be given to each team member of a team having a plurality of players, in which different team players may have different contribution.

Due to the fact that SV uniquely gives fair data valuation, this function may be used by the data-sharing service 206 for deriving the values of datasets of different data providers 202, wherein the i-th SV $s_i$ represents the value of datasets of the i-th data provider $202_i$ relative to other data providers 202. However, the number of utility function evaluations required by the exact SV calculation grows exponentially in the number of players (which are the data points in data Shapley value case), whose time complexity is $O(2^N)$, let alone for using machine-learning approaches, evaluating the utility function itself is already computationally demanding (i.e. long training time to build a machine-learning model, which can generate a performance metric) (see Reference R3). Hence, an exact SV on the data point level is computationally prohibitive if not impossible.

There have been prior arts proposing efficient approximation methods which can reduce the time complexity of the utility function evaluations of SV, for example to $O(N^2 \log N)$ by using Monte Carlo sampling (see Reference R9), or to O(N) using influence function (see Reference R10). However, these existing methods have their own limitations. For example, Monte Carlo sampling introduces randomness when drawing the permutation of the set. As there is no approved method on sampling, such randomness in introduced by Monte Carlo sampling may lead to inconsistent results. Methods such as Influence function have strong assumptions of smooth loss function or stable algorithm for approximation, which usually do not stand in real-world case.

As a result, existing Shapley value based data valuation methods may not satisfy the desired property of effectiveness of the data-sharing service 206 of the data-sharing system 100, since the existing methods are not feasible enough to scale in computation speed in practical cases and/or the approximated valuation results are far from the real data value.

In addition to the above-described issues in existing Shapley value based data valuation methods, data valuation may be difficult because:
1) the rules for supply and demand in the data-sharing service 206 is unconventional since the replication costs of digital and data products are low and thus may have almost unlimited supply (see Reference R1);
2) there is a balance in choosing between data's intrinsic properties (such as the volume, freshness of a dataset) versus data's extrinsic properties (the value a dataset can bring to a specific task, such as using a dataset of historical weather recording to train an AI model for a weather forecasting task) when the unit value of data is being determined (see Reference R2);
3) versatility in the potential of data to help solve real-world tasks. In other words, the same dataset may have different usefulness when being used to train AI models for different tasks. For example, a dataset of historical weather recording may be used to train an AI model for weather forecasting task with a 95% accuracy. However, the same dataset when being used in a task of taxi-call prediction may only result in an AI model with 70% accuracy. In the second task, the datasets of historical taxi-calls based on the time of the day, and historical taxi-calls based on the postal code may be used to train an AI model with 90% accuracy.

Moreover, the data-sharing service 206 may need to handle or otherwise process vast amount of data in real-time or within a limited time period to ensure data usefulness. For example, YouTube® (youtube.com; YouTube is a registered trademark of Google LLC, Mountain View, CA, USA) has 2 billion monthly active users (last updated Oct. 20, 2020), 30 million daily active users (last updated Sep. 9, 2019), more than 1 billion videos watched per day (last updated Oct. 20, 2020), and 500 hours of videos uploaded per minute (last updated Oct. 20, 2020); source: https://www.omnicore-agency.com/youtube-statistics/

Those skilled in the art will appreciate that manual processing (for example, featuring extracting, categorizing, evaluating, valuing, and/or the like) such an enormous amount of data such as that of YouTube® is practically impossible (that is, practically impossible to manually process the enormous amount of data, and practically impossible to manually process the enormous amount of data within a practically feasible period of time to meet the requirements of both data providers 202 and data consumers 204), and a carefully designed data-sharing service 206 is required.

Many contributions of the community in theory, algorithms, and systems have been seen to solve the problems of data sharing, discovery and integration (see Reference R2). However, existing data valuation and incentive allocation methods are suboptimal in terms of motivating the data providers to contribute their unprocessed or raw data to data-sharing systems, wherein the main reasons may include but not limited to,
1) the existing data sharing systems mostly adopt naïve data valuation via basic qualitative features (for example, volume of a dataset) which may lead to loose connection to real-world tasks, for example tasks related to the data consumers' targets;
2) The basic-feature-based data valuation methods adopted in existing data sharing systems may lack machine-learning approaches embedded in the system.

Hence, the existing data sharing systems may fail to produce fair data valuation.

For example, the Mashup builder data-market platform described in Reference R2 performs data valuation based on data's qualitative properties such as the volume of the dataset. The system works in the following steps:

Step 1: The system collects willing to pay (WTP) prices from the data consumers.

Step 2: The system prepares and integrates the data (via Mashup Builder), which were collected from the data providers.

Step 3: The Mashup Builder runs data valuation based on intrinsic properties of the data, such as the volume of the datasets.

Step 4: The pricing-engine function in the system combines the data value and the WTP from the data consumers and run data-pricing algorithm.

Step 5: The system displays the pricing list to the data consumers and the data providers. If the negotiation reaches an agreement, the system enables data transaction with data consumers and incentive allocation to data providers.

The problems/disadvantages of the Mashup-builder based incentive allocation system are as follows:

Mashup Builder evaluates the data value only based on basic and intrinsic properties of the data. Such data valuation outcome misses the evaluation of the important usefulness of the data and makes the negotiation passive for data providers. This feature of existing system lacks the desired property of flexibility of a system.

The Mashup Builder system by design favors the preferences from the data consumers (task owners), hence did not achieve the optimal equilibrium among multiple parties due to the lack of a fair incentive allocation. This feature of existing system lacks the desired property of fairness of a system.

The Mashup Builder system is only equipped with limited usage of the cloud-computing system by mostly using the cloud-computing system for storage of data and basic data fusion operations. This limited usage of the cloud-computing system discourages the system's ability of continuously improving AI "supermodels". Together combined with the lack of fairness, existing systems similar to the Mashup Builder is lacking the long-term incentives to satisfy the desired property of sustainability of a system.

There have been related prior art proposing to promote better equilibrium using bi-level programming model between WTP and data quality during data pricing (see Reference R4) which tries to maximize the profit by the owner of the data and the utility to the consumers to satisfy the fairness property. However, such a system may still be more favorable to data providers since data consumers would not know the data's usefulness to their specific tasks by merely using the simple form of data quality assessment.

Other prior art focuses on balancing the equilibrium parties of data providers and data consumers by using a) qualitative parameters (basic attributes or meta-attributes of the dataset) combining with b) fixed and marginal cost parameters for the data consumers and c) estimated value of data for the data providers during pricing (see Reference R5). However, estimating the true value of data is a difficult task. The method in Reference R5 adopts proxies for data value such as a market-set automated price using a sealed bid auction system, for example, Google AdWords, and therefore is a suboptimal solution for data valuation. Hence, the system of Reference R5 may still fail to balance the intrinsic and extrinsic properties of data, and miss the capacity to relate the data value to the real-world tasks that the data consumers truly care about, thereby lacking the flexibility property.

Some recent related arts have started to realize the importance of connections between data value to the utility of using them to build AI models. For instance, Reference R6 focuses on developing a particular pricing model that takes into account both WTP and utility of the data, which is estimated from the performance of machine-learning algorithms built from the data. However, this work did not consider the system-level structure, and did not dive into the how advanced data mining and analytics can be used to facilitate a fair incentive allocation.

Therefore, existing data-sharing systems may have drawbacks such as:

1) Existing data-sharing systems mostly adopt naïve data valuation via basic and intrinsic qualitative features (for example, the volume of the datasets) which may lead to a loose connection to real-world tasks.

2) The basic-feature-based data valuation methods adopted by existing data-sharing systems may lack machine-learning approaches and advanced and flexible data-mining analytics embedded therein. Hence, the existing data-sharing systems may fail to produce fair data valuation, which further hampers the sustainability of these systems.

In view of above-described drawbacks, the data-sharing service 206 of the data-sharing system 100 disclosed herein incentivizes sustainable data sharing through a method using a fair and effective evaluation of a value of the data, by including both the intrinsic and extrinsic properties of the data while drawing close connections to specific real-world tasks using advanced machine-learning methods. In embodiments where the data-sharing service 206 is implemented on or interacts with a cloud-computing system, such a method may facilitate data alliance to grow and boost the performance of "supermodels", which may encourage data consumers 204 to also act as data providers so as to contribute in a long-term returning manner that nurtures the data-sharing eco-system.

According to one aspect of this disclosure, the data-sharing service 206 of the data-sharing system 100 disclosed herein provides multi-angle incentive allocations based on data valuation. More specifically, the data-sharing service 206 disclosed herein provides multi-angle incentive allocations based on data valuation with advanced data-mining methods to reveal a comprehensive view of data as an asset. The data-sharing service 206 disclosed herein take into account both data providers' and data consumers' requirements and keeps the equilibrium thereof. In some embodiments, the data-sharing service 206 may be implemented on a cloud-computing system.

Compared to prior-art systems, the data-sharing service 206 disclosed herein provides high flexibility, convincing fairness, great sustainability, and reasonable effectiveness, such as:

Flexibility: valuing data in different scenarios/tasks to fit the data consumer's requirements;

Fair allocation: comprehensive views to consider different angles of contributions to facilitate the fair allocation;

Sustainability: attracting the parties such as the data providers and data consumers to return to contribute more data, and encourage long-term data sharing; and Effectiveness: enables an accurate and efficient system.

More specifically, the data-sharing service 206 disclosed herein selects scenario-inspired route to analyze the data by basic and intrinsic features and also by the usefulness of the data to solve data consumer's specific real-world tasks, thereby achieving high flexibility.

The data-sharing service 206 disclosed herein uses a multi-angle alliance view to take into account various angles of data alliance and client application scenario alliance, and infuses the data-sharing service 206 with the advanced analytics and data mining approaches for a fair incentive allocation, thereby achieving convincing fair allocation.

In the data-sharing service 206 disclosed herein, both the fair incentive allocation method and the AI models with growing utility encourage long-term data sharing. By using a cloud-computing system, it is feasible to facilitate data alliance and enable the training of "supermodels" using the increasing amount of data made available by data alliance. The ever-improving performance of "supermodels" may attract the data providers 202 and data consumers 204 to return to contribute more data which in turn benefits themselves by being provided access to a powerful "supermodel". Therefore, the data-sharing service 206 disclosed herein provides great sustainability.

Moreover, on the data valuation method level, the data-sharing service 206 disclosed herein adopts coreset-based data Shapley valuation (described in more detail later), thereby enabling efficient data valuation with reasonable effectiveness.

C. Data-Sharing System: Dataflow

Figure 5:
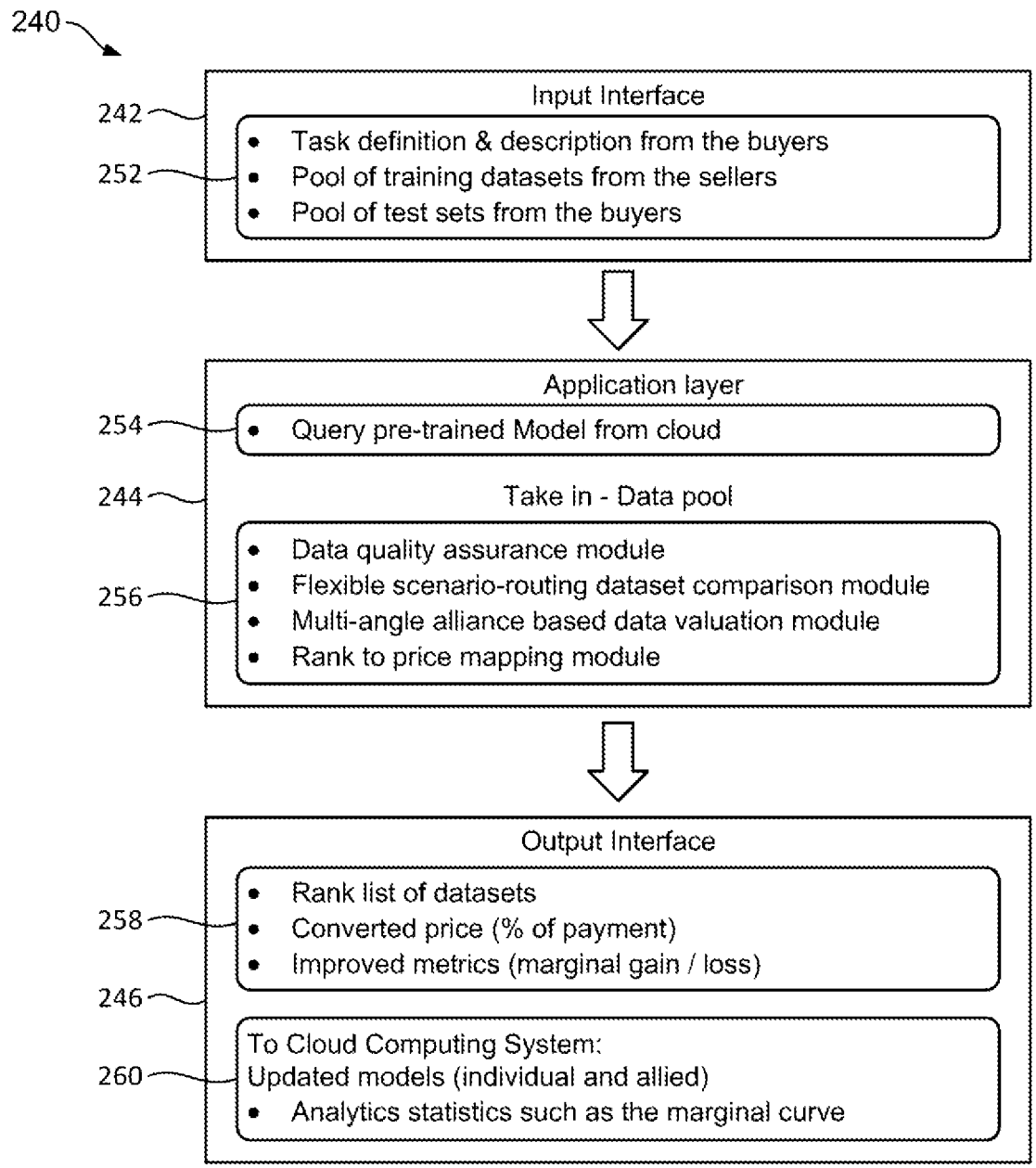

FIG. 5 shows the dataflow 240 of the data-sharing system 100. As shown, from the dataflow point of view, the data-sharing system 100 comprises an input interface 242, an application layer 244 implementing various modules including a multi-angle valuation module, and an output interface 246. Herein, the application layer 244 is a part of the data-sharing service 206 of the data-sharing system 100. In some embodiments, the data-sharing service 206 also comprises the input and output interfaces 242 and 246 which communicate with client application programs (such as a web browser, an app, or other client application programs; not shown in FIG. 5) executed by the client computing devices 104, and/or the client computer systems 106 for inputting and/or receiving data and other information to and/or from the data-sharing service 206.

The input interface 242 is configured for interacting with the users (that is, the data providers 202 and the data consumers 204) to provide the task definitions and descriptions of the target task (for example, see Reference R11) provided by data consumers 204. The task definitions may be chosen from a list of options of categories of target tasks such as classification, regression, detection, segmentation, de-noising, and/or the like. Task descriptions may include more detailed information about the target task, such as when the target task is classification, the detail information may include a set of class labels, a loss function for an AI model which performs the target tasks, and the evaluation metric to evaluate the AI models' performance (for example, the accuracy of the prediction on a test dataset). The input interface 242 also receives input datasets provided by the data providers 202 (optionally with label information) and test datasets (which will be used for inference) from the data consumers 204 with label information.

Herein, each input dataset is obtained from a corresponding data provider 202 and may comprise various types of data elements such as images, video clips, weather data, and/or the like that tie to various client applications. The input datasets from the data providers 202 are the datasets to be shared with data consumers 204. Meanwhile, the input datasets are also used for training AI models 228 used by the data-sharing service 206 of the data-sharing system 100 for a specific task. Therefore, the input datasets are also denoted as "training datasets" hereinafter.

Herein, each test dataset represents an application scenario of the corresponding users (such as data consumers 204 and/or data provider 202 (when acting as a data consumer)), and is used for evaluating the values of the input datasets provided by the data providers 204. For example, as will be described in more detail later, test datasets may be provided to an AI model which has been trained by a data provider's dataset which generates a set of predictions, which is compared with a task definition to evaluate the value of the data provider's dataset and generate an evaluation score therefor (described in more detail later). When test datasets from a user is applied to a trained AI model 228 of the same user (that is, the user is both the data provider 202 and data consumer 204), it may be denoted as evaluation on self-client application scenarios. When test datasets from other users are applied to a trained AI model of the user (that is, the user is the data provider 202 and the other users are data consumers 204), it may be denoted as evaluation on cross-client application scenarios.

The above-described inputs are collected by the input interface 242 and sent to the application layer 244 which queries the data layer which obtains pre-trained AI models or "supermodels" from the cloud-computing system (if available) (254), and starts the core functionality of data valuation 256 by running a plurality of functional modules (simply denoted "modules" hereinafter) including a data quality assurance module, a flexible scenario-routed dataset comparison module, a multi-angle alliance guided data valuation module, and a rank-to-unit-value mapping module (described in more detail later). In some embodiments, the data quality assurance module and the flexible scenario-routed dataset comparison module may be optional.

Then, the application layer 244 sends outputs to the output interface 246. The outputs include a first set of outputs 258 to the users (via the users' client computing devices 104 or client computer system 106) such as a ranking of the value of datasets from different data providers 202, corresponding converted unit value of data, or corresponding incentive-split scheme, and the improved performance metrics in regards to the tasks (e.g. the accuracy of prediction using the trained model) by using individual datasets to help data consumers 204 to make data-acquisition decision. The outputs also include a second set of outputs 260 (for example, to the cloud-computing system) for updating an improved version of the AI model or a supermodel trained from the data made available by the data alliance for future usage. At the same time, the data-sharing service 206 of the data-sharing system 100 stores advanced analytics such as the marginal curve from using incoming datasets for future long-term analysis.

Data processed by the data-sharing service 206 of the data-sharing system 100 through the above-described data flow may comprise a broad range of data types, such as structured data, semi-structured data, and unstructured data (for example, multimedia data such as images and videos). The data-sharing service 206 may leverage existing work (such as existing work on the rules and techniques) for structured data (for example, see Reference R2), and use novel strategies for unstructured data.

D. Data-Sharing System: Example of Detailed Functional Structure

Figure 6:
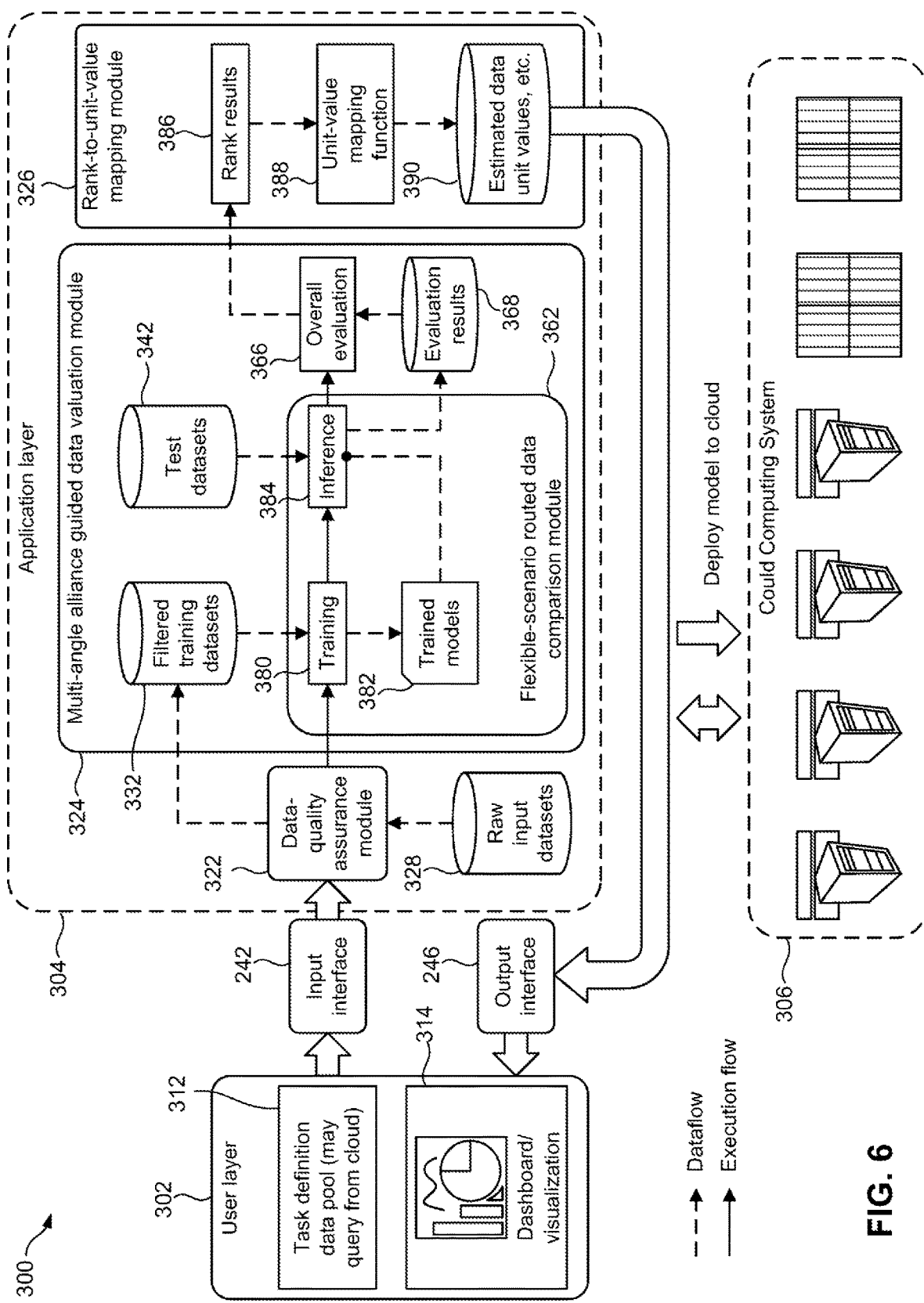
FIG. 6 is a schematic diagram showing the detailed functional structure of the data-sharing system, according to some embodiments of this disclosure.

FIG. 6 is a schematic diagram showing the detailed functional structure 300 of the data-sharing system 100, according to some embodiments of this disclosure. In this figure, the execution path or flow is represented using solid-line arrows. While the dataflow is generally with the execution path, the dataflow in FIG. 6 are shown separately using broken-line arrows for better illustration.

As shown, the data-sharing system 100 comprises a user layer 302, an input interface 242, and an output interface 246, an application layer 304, and optionally a cloud cloud-computing system 306. The user layer 302 comprises client application programs communicating with the input interface 242 and output interface 246 (also see FIG. 5), and the application layer 304 and cloud-computing system 306 correspond to the application layer 244 shown in FIG. 5. In various embodiments, the three layers may be implemented as separate functional components (such as separate application programs or separate application program modules), or may be implemented as an integrated functional component (such as one application program or application program module).

The user layer 302 is coupled to the application layer 304 via the input interface 242 and the output interface 246. The user layer 302 comprises a plurality of user interfaces (UIs such as graphic user interfaces (GUIs)) such as the task-definition data pool 312 and the dashboard/visualization interface 314 shown in FIG. 6 for interacting with data providers 202 and data consumers 204.

In particular, the user layer 302 provides a UI of the task-definition data pool 312 for data consumers 204 to enter their task definitions and descriptions. The task definitions may be chosen by the data consumers 204 from a default list of options of categories such as classification, regression, detection, segmentation, de-noising, and/or the like. The task descriptions may include more detailed information about the task, such as the class labels, the loss function (also denoted the "cost" function of an optimization), and the evaluation metric to evaluate the train models' performance (for example, the accuracy of the prediction on a test set).

The user layer 302 also provides the dashboard/visualization interface 314 to the data consumers 204 for displaying the estimated unit value of each individual dataset and analytics of each individual dataset, such as the improved performance metrics in regards to the tasks of the data consumers 204 (for example, the accuracy of prediction using the trained model), which may assist the data consumers 204 to make data-acquisition decisions.

The user layer 302 further provides a UI for the data providers 202 to upload their input datasets and for the data consumers 204 to upload their test datasets.

The application layer 304 comprises a data-quality assurance module 322 coupled to a multi-angle alliance guided data-valuation module 324, which is in turn coupled to a rank-to-unit-value mapping module 326. The application layer 304 receives inputs entered by users from the user layer 302. The received inputs include the task definitions and descriptions from data consumers 204 (via the task-definition data pool 312), the test datasets 342 from the data consumers 204 (into the data-valuation module 324), and the raw or unprocessed input datasets 328 from the data providers 202. The application layer 304 may optionally queries a previously trained "supermodel" from the cloud cloud-computing system 306 to use as the pre-trained model.

The raw input datasets 328 received from the data providers 202 are sent to the data-quality assurance module 322 (detailed in more detail later in subsection E) to filter out poor quality data and produce or otherwise generate the filtered training datasets 332 (into the data-valuation module 324), extract statistics, and send the filtered training datasets 332 and statistics thereof to the scenario selection function of the flexible-scenario routed dataset comparison module 362 to choose the best routing for data valuation given the target task of the data consumers 204 (described in more detail in subsection F). For ease of description, the filtered training datasets 332 are also simply denoted "training datasets" hereinafter.

With the selection of the AI model performance comparison route from the routing function (described later), the AI engine 214 (see FIG. 4) uses a training function 380 to train the AI model 228 using each of the filtered training datasets 332 obtained from the data-quality assurance module 322 and a machine learning algorithm, such as supervised or semi-supervised learning, to generate a plurality of trained AI models each corresponding to a filtered training dataset 332. Then, an inference function 384 of the data-valuation module 324 starts the valuation computation process (described in more detail in subsection G) for testing each of the trained AI models using the test datasets 342 and computing an evaluation value 368 for each trained AI model (which represents the value of the corresponding filtered training dataset 332). An efficiency-improved method based on the most important subset of the input dataset may be used to speed up the valuation computation (described in more detail in subsection H). The obtained evaluation values 368 are combined by the overall evaluation function 366 for generating data value ranking results for the datasets 332 which are then output from the data-valuation module 324 to the rank-to-unit-value mapping module 326 for generating rank results 386 for the filtered training datasets 332, which are the used by the unit-value mapping function 388 to generate an incentive-split scheme (such as the estimated unit values of the datasets 332, that is, the estimated value of a unit of data of each dataset 332 (for example, estimated value per image, estimated value per video clip; estimated value per second of video clip, estimated value per megabyte of data, or the like) for calculating incentives (received from data consumers 204) to be distributed to the data providers 202. Finally, the application layer 304 stores the output such as ranking with supporting statistics (for example, the improved performance metrics such as the accuracy improvement), the estimated unit values of the datasets, the calculated incentives, and/or the like in a storage 390, sends the output to the user layer 302 via the output interface 246, and sends the trained AI models and the related evaluation results 368 to the cloud computing system 306 for storage thereon.

In some embodiments, the cloud-computing system 306 provides the hardware resources and infrastructures for training the AI models, storing trained AI models, and conducting advanced data mining, thereby providing advantages over existing systems as will be described in more detail below. Specifically, the cloud-computing system 306 has infrastructure-as-a-service (IaaS) that may be used to provide memory and processing structures for executing the code for training an AI model. During the runtime of training AI models in the data valuation module 324, the cloud-computing system 306 communicates with the application layer 304 when a pre-trained "supermodel" is queried, or a newly trained AI model is received from the application layer 304 to update the existing pre-trained "supermodel".

E. Data-Quality Assurance Module

The data-quality assurance module 322 partially uses existing work described in References R12 and R13 and comprises new features.

Figure 7:
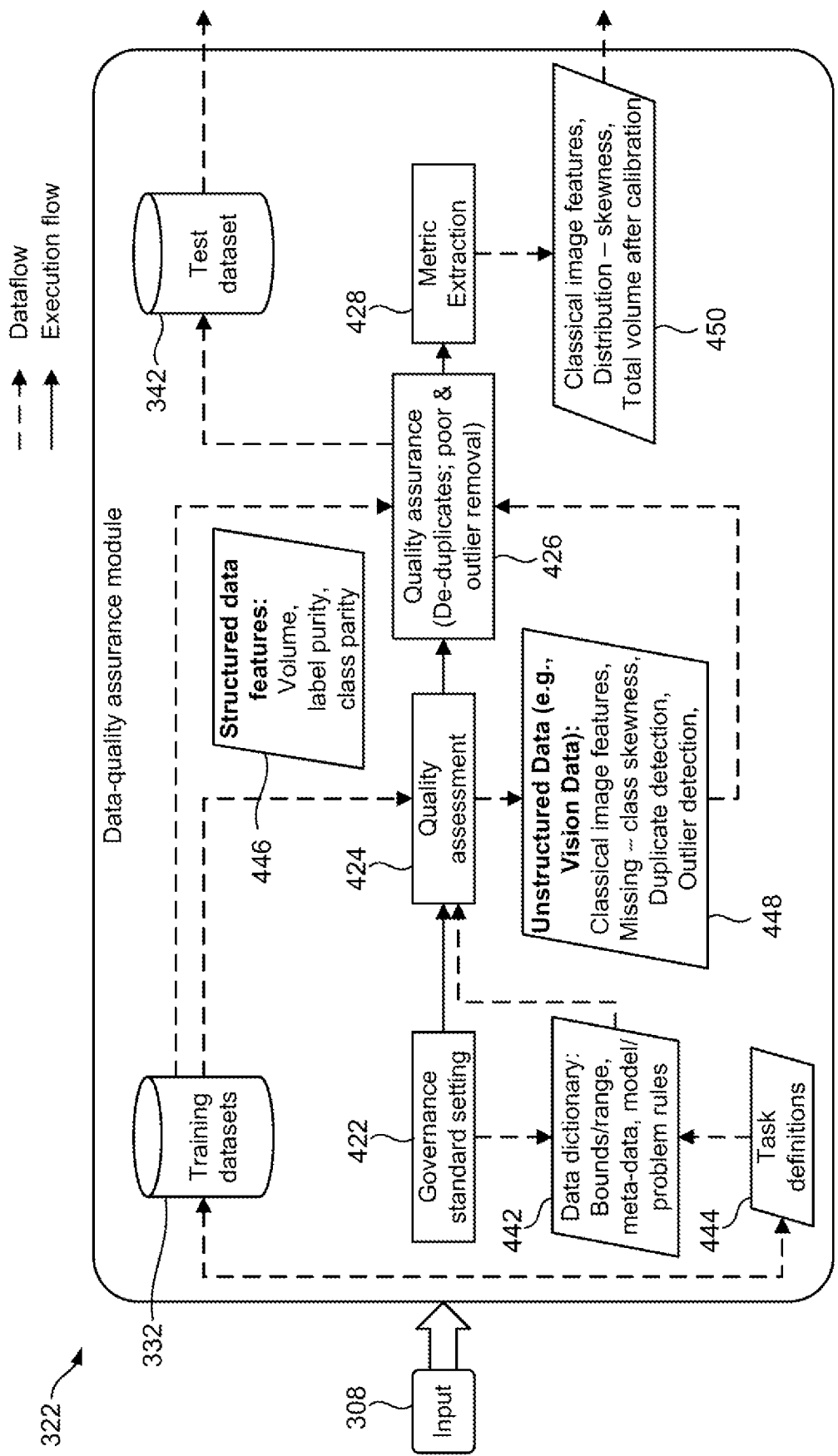
FIG. 7 is a schematic diagram showing the data-quality assurance module of the data-sharing system shown in FIG. 6.

FIG. 7 shows the detail of the data-quality assurance module 322. As shown, the data-quality assurance module 322 comprises a plurality of sequentially coupled functions including a governance standard setting function 422, a quality assessment function 424, a quality assurance function 426, and a metric extraction function 428.

The governance standard setting function 422 configures the data dictionary 442 which defines the meta-data glossaries, including data terms and the corresponding descriptors (including but not limited to the meaning, owner, format, bounds and range of minimum and maximum values) based on the task definitions 444 (received from data consumers 204). Moreover, rules 446 and 448 for structured and unstructured datasets, respectively, are set or otherwise defined to reflect the validation policy in a specific field. Such rules may comprise rules for missing data imputation, data-integrity violation criteria, detection of duplicates and purging inconsistent data, and detection of outliers (see Reference R12). For example, rules in the field of natural image classification may include:

(1) when imputation missing data, if the image pixels are corrupted, recovering the damaged pixels using inpainting techniques which, as those skilled in the art understand, use a conservation process to fix images by filling damaged, deteriorating, or missing parts of an image with suitable pixels such as pixels derived based on the content of neighboring pixels.

(2) when detecting duplicates of images, one of the duplicated images is save and others are removed from the dataset; and (3) outliers of images, if detected, are removed from the dataset.

Then, the quality assessment function 424 and the quality assurance function 426 detect and resolve issues based on the defined rules 446 and 448 and extract meta-data information. In some embodiments, existing technologies and rules 446 may be used for processing structured data, such as quality analysis and data cleaning preparation (for example data homogeneity, label purity, class parity; see Reference R13). For unstructured data such as images and videos, the dictionary 448 is used to encompass metrics such as volume of the dataset, image resolution, noisy level, image corruption degree, and class skewness as the meta-data.

Following above-described rules, de-duplicates and outlier removal are also performed to filter out poor quality data points, followed by a calibration of dataset volume and class distribution of the clean dataset using the metric extraction function 428.

The extracted meta-data metrics 450 is then outputted from the metric extraction function 428 to the scenario selection function of the flexible-scenario routed dataset comparison module 362 for making a decision on which route of dataset comparison to choose. The filtered training datasets 332 are outputted to the data valuation module 324.

F. Flexible-Scenario Routed Dataset Comparison Module

Figure 8:
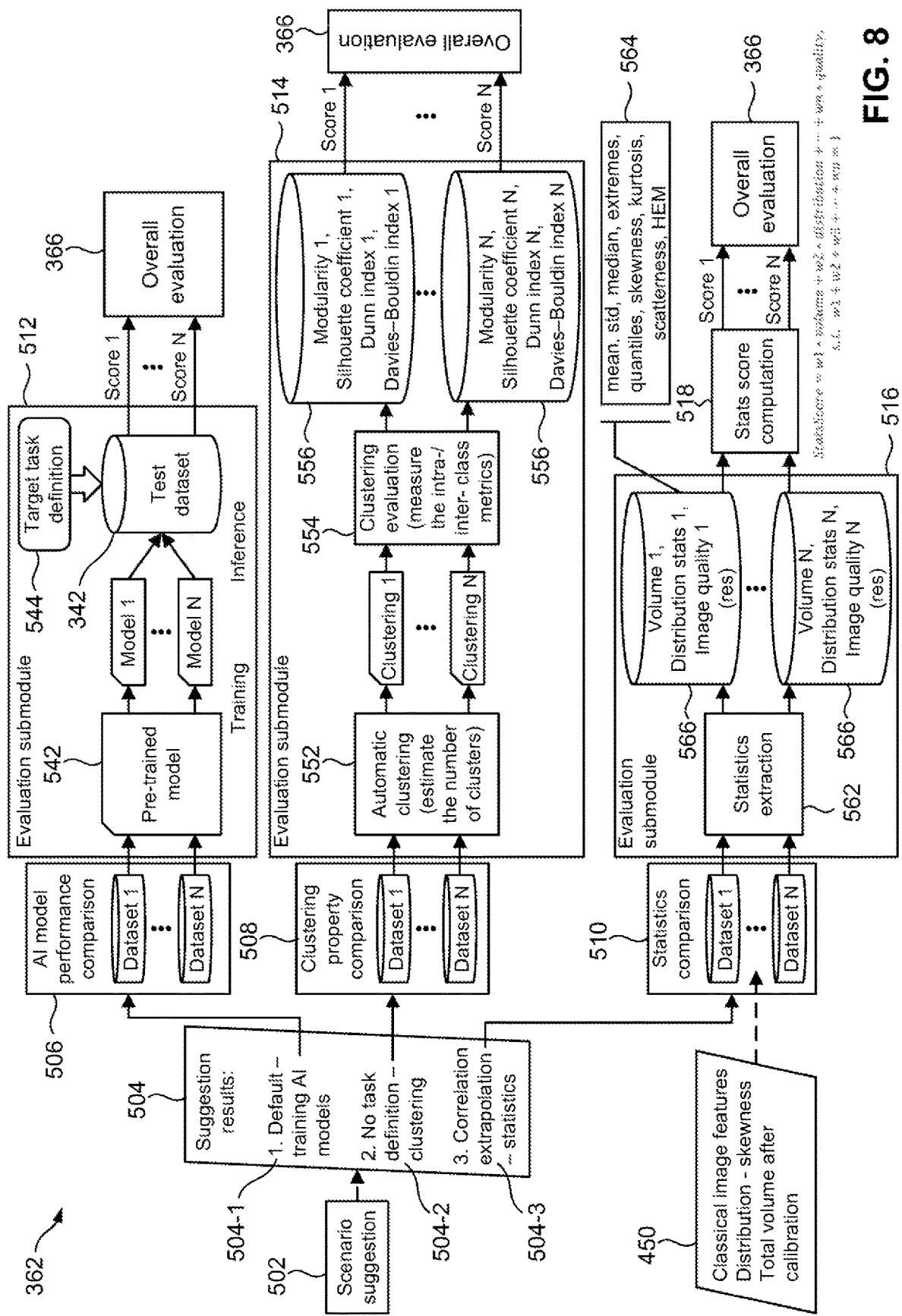
FIG. 8 is a schematic diagram showing the flexible-scenario routed dataset comparison module of the data-sharing system shown in FIG. 6.

The flexible-scenario routed dataset comparison module 362 uses the training function 380 to perform training of the AI models using the input dataset and a machine learning algorithm, such supervised learning or semi-supervised learning, to generate the trained AI models 382 and the inference function 384 to provide the test datasets 342 to the trained AI model for evaluating the versatility of usefulness of an input datasets for specific tasks. FIG. 8 shows the details of the flexible-scenario routed dataset comparison module 362. As shown, the flexible-scenario routed dataset comparison module 362 comprises a scenario-suggestion function 502, a decision-making function 504, a plurality of execution routes 506 to 510 each having an evaluation submodule 512 to 516 for executing a corresponding evaluation method, and a statistics score computation function 518.

In some embodiments, the execution routes of the flexible-scenario routed dataset comparison module 362 comprise:

an AI model performance comparison route 506 which comprises the evaluation submodule 512;

a clustering properties comparison route 508 which comprises the evaluation submodule 514; and a statistics comparison route 510 which comprises the evaluation submodule 516.

The flexible-scenario routed dataset comparison module 362 selects one of the three routes based on the task definitions 444 received from the user layer 302. Specifically, the scenario suggestion function 502 receives the task definitions 444 from the user layer 302 (via the input interface 242), and analyses the tasks to decide which execution route to continue in the flexible-scenario routed dataset comparison module 362.

In the decision-making function 504, if the task definition indicates a clear target task for the data consumer 204 (504-1; which is the default setting for training AI models), then the execution routes to the AI model performance comparison route 506 to train AI models using the filtered training datasets and evaluate the filtered training datasets.

In particular, the data valuation module 324 uses the evaluation submodule 512 wherein the N filtered training datasets 332 (denoted Dataset 1 to Dataset N)) are applied to the pre-trained AI model 542 to train the pre-trained AI model 542 and obtain N trained AI models Model 1 to Model N.

The AI engine 214 uses the one or more test datasets 342 to evaluate each of the N trained AI models Model 1 to Model N for inferring or evaluating the value thereof with respect to the target task definition (received from the data consumer 204). For each of the N models Model 1 to Model N, the inferred or evaluated performance metrics thereof on the target task definition are combined to obtain a quality score thereof (described in more detail in subsection G) as the evaluation result 368. The N quality scores Score 1 to Score N are sent to the overall evaluation function 366 for generating data value ranking results for the datasets 332 which are output to the rank-to-unit-value mapping module 326 (see FIG. 6) for determining the value-ranking of the training datasets Dataset 1 to Dataset N, and determining the incentive-split scheme based on the determined value-ranking. The incentives provided by the data consumers 204 are split to the data providers 202 according to the determined incentive-split scheme and transferred to the data providers 202 once the training datasets Dataset 1 to Dataset N are shared to the data consumers 204.

Referring again to FIG. 8, in the decision-making function 504, if the task definition is not given as an input from the data consumer 204 (504-2), then the execution routes to the clustering properties comparison route 508.

In this route, the data valuation module 324 uses the evaluation submodule 514 wherein a data mining method is used to evaluate the separability from clustering performance metrics. In particular, the N filtered training datasets Dataset 1 to Dataset N are applied to an automated clustering process 552 with the functions of estimating clusterability and estimating the number of clusters. The obtained clusters Clustering 1 to Clustering N are fed to the clustering evaluation function 554 for computing the clustering outcome metrics 556 which measures the intra-class relationship and inter-class relationship, such as modularity (see Reference R14), silhouette coefficient (see Reference R15), Dunn index (see Reference R16), Davies-Bouldin index, and/or the like, for generating N quality scores Score 1 to Score N for the N training datasets Dataset 1 to Dataset N as the comparison results 368, which are sent to the overall evaluation function 366 for generating data value ranking results for the datasets 332.

In the decision-making function 504, if both the data provide 202 and data consumer 204 have entered their task definitions into the systems and the task definitions entered by the two users 202 and 204 match with each other, the execution routes to the statistics comparison route 510 which also takes in the extracted meta-data metrics 450 outputted from the data-quality assurance module 322.

This route is based on the theory that the performance of a machine-learning model correlates between training data's distribution difference. Then one may extrapolate a model's performance based on statistical feature distance between the training and test datasets.

In this route, the data valuation module 324 extracts (562) statistics 564 of the datasets with respect to various features 566 thereof, such as the volume, distribution features, and the image quality metrics extracted from the data-quality assurance module 322. The statistics 564 may comprise mean, standard deviation (std), median, extremes, quantiles, skewness, kurtosis, scatterness, hard example mining (HEM), and/or the like. The statistics score computation function 518 then uses the statistics to calculate the N quality scores Score 1 to Score N for the N training datasets Dataset 1 to Dataset N as the comparison results 368, which are sent to the overall evaluation function 366 for generating data value ranking results for the datasets 332. In this embodiments, each of Score 1 to Score N is a statistics score (denoted) calculated as, for example:

$$StatsScore_i = w_{1i}*volume_i + w_{2i}*distribution_i + \ldots + w_{ni}*quality_i, \quad (2)$$

$$s.t. \; w_{1i} + w_{2i} + \ldots + w_{ni} = 1$$

where $StatsScore_i$ is the i-th statistics score (i=1, 2, ..., N) for the i-th training dataset, $w_{1i}, w_{2i}, \ldots, w_{ni}$ are weighting factors associated with the i-th training dataset with summation thereof equal to 1, $volume_i$, $distribution_i$, ... $quality_i$ are the features of the i-th training dataset, and "s.t." represents "subject to".

G. Multi-Angle Alliance Guided Data Valuation Module

The multi-angle alliance guided data valuation module 324 may provide comprehensive and fair data valuation from both local and global views.

As those skilled in the art will understand, it may be preferable to leverage big data in building supermodel (big base model) to boost AI model' performance (see Reference R17). However, limited data source from individual sources has seen the difficulty in possessing the diversity and abundance of the data for building such data products.

By using the data-sharing system 100, data alliance (see References R18 and R19) may be a competitive solution in fusing and combining data across different data providers 202 (which may be different organizations) and/or different client application scenarios for building powerful AI models.

Existing systems with mashup mechanism are equipped with a basic format of data alliance to some degree. However, their contribution assignment (mostly based on basic qualitative properties such as the volume of the datasets) is lacking a bird's-eye view of how the data consumers 204 (who are in many cases also data providers 202) evaluate the data value, hence fails to deliver a fair contribution allocation. For example, when using an AI model built from the alliance data, the customers/clients might consider both a local angle towards the AI model's performance on their individual client application scenarios/platforms, and a global angle focusing on the AI model's generalizability (see References R20 and R21) to all client application scenarios/platforms (self- and other-platforms), especially when the application scenario overlapping occurrence is highly possible. For instance, individual users of the applications may upload the same multimedia contents to different multimedia streaming application platforms.

In order to facilitate a fair incentive allocation, the data valuation module 324 uses a unifying formula that considers two dimensions of alliance and two perspectives of contribution evaluation criteria.

There are two dimensions of alliance in the multi-angle alliance guided data valuation module 324 including:
(i) Data alliance, where the service providers ally different data sources to build a big AI model; and
(ii) Client application alliance, where the contribution evaluation is conducted on the aggregated allied set of client application platforms.

The client application alliance implements the multi-angle data valuation through:
(1) using the local contribution as a direct evaluation of the AI model's performance on individual client application scenario, and
(2) the global contribution as the generalizability of the allied AI model to all client application scenarios.

Figure 9:
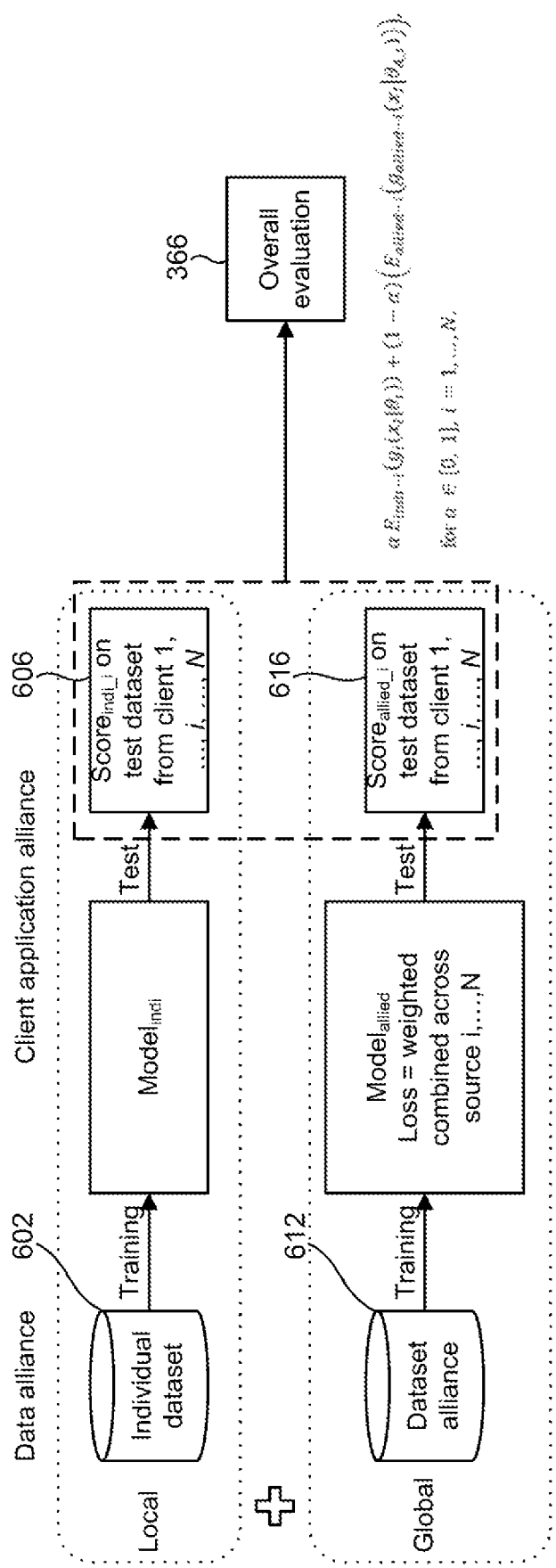
FIG. 9 is a schematic diagram showing the unifying formula for multi-angle alliance operations in the data valuation module of the data-sharing system shown in FIG. 6.

The unifying formula for multi-angle alliance operations in the data valuation module 324 is shown in FIG. 9. As can be seen, at the local branch, individual datasets 602 (which are the filtered training datasets 332 provided by the data providers 202) are used to obtained N trained models $Model_{indi\_i}$ (i=1, ..., N) (collectively denoted $Model_{indi}$) through training, wherein each individual model $Model_{indi\_i}$ is associated with a data provider 202. For ease of description, the N trained models $Model_{indi\_i}$ trained by the N individual training datasets are denoted "individual models" hereinafter (compared to the "allied models" to be introduced).

Test datasets are then applied to each of the N individual models $Model_{indi\_i}$ for obtaining a group of inferred or evaluated performance metrics (wherein each test dataset gives rise to a performance metric of the individual model, representing the value of the individual model with respect to the task definition associated with the test dataset). As there are N individual models $Model_{indi\_i}$, there are N groups of inferred or evaluated performance metrics.

Each group of inferred or evaluated performance metrics are then combined to obtain an individual quality score Score$_{indi\_i}$ (606) for the corresponding individual model Model$_{indi\_i}$ (in other words, for the corresponding data provider).

At the global branch, dataset alliance 612 are used for obtaining a plurality of trained models Model$_{allied}$. For ease of description, these N trained models Model$_{allied}$ are denoted "allied models" hereinafter (compared to the "individual models" to introduced above).

Herein, dataset alliance 612 comprises a number of aggregations of various subsets of the N training datasets 332 (denoted "aggregated training datasets" or "allied training datasets" hereinafter). In particular, each aggregated training dataset comprises at least two of the N training datasets 332 forming a training dataset of the dataset alliance 612. For example, dataset alliance 612 may comprise all aggregations of two of the N training datasets 332, three of the N training datasets 332, . . .

The training datasets of the dataset alliance 612 are used to obtain a plurality of allied models Model$_{allied}$. The test datasets are then fed to the allied models Model$_{allied}$ for obtaining a plurality of inferred or evaluated performance metrics (denoted "allied performance metrics"), which are then combined to obtain N allied quality scores Score$_{allied\_i}$ (i=1, . . . , N) (616) for the N corresponding data providers.

The overall evaluation function 366 then combines the individual quality scores Score$_{indi\_i}$ and allied quality scores Score$_{allied\_i}$, for example, as a weighted sums, to obtain the final scores Score$_i$ (i=1, . . . , N) for ranking.

Thus, the unifying formula shown in FIG. 9 features the multi-angle view and covers all possible combinations of the two dimensions of alliance. In these embodiments, any forms of absence of "alliance" may be viewed as a reduced version of the unifying formula. Examples of the reduced versions of the unifying formula are:

Version 1—Client application alliance only, wherein the individual models Model$_{indi}$ are trained using individual datasets 602, but evaluated on both self- and cross-client application scenarios.

Version 2—Data alliance only, wherein combined datasets (dataset alliance 612) are used to train the allied model Model$_{allied}$, which is evaluated only on a specific client application whose dataset is being valued.

Version 3—No alliance on data nor client application: the unifying formula reduces to only training local model Model$_{indi}$ using individual dataset, and evaluating the model performance on the corresponding client application scenario.

The unifying formula is further explained below using the default AI model performance comparison route 506 as an example. Without loss of generality, the unifying formula may also be used in the other two routes (that is, the clustering properties comparison route and the statistics comparison route) by replacing the AI model performance metrics with the distance of the extracted metrics.

To further explain the unifying formula, FIGS. 10A to 10C show the workflow of the multi-angle alliance guided data valuation module 324. In this example, there are N training datasets from different data providers 202 who are also the data consumers 204.

As shown in FIGS. 10A to 10C, in the training function 380, individual and allied models are trained. In the test/inference function 384, both individual and allied models are evaluated on local and global view of scenarios. Then the performance metrics are fed into the overall evaluation function 366, where the data alliance view fits into the Shapley valuation framework.

More specifically, with reference to FIGS. 6 and 10A to 10C, the data valuation module 324 starts with the training function 380 which trains AI models using a pre-trained model 642 (optional and if available) and filtered training datasets 332, and initializing the model parameters with pre-trained weights (if available) or random initialization (if the pre-trained model is not available). As shown in FIG. 10B, each training dataset (Training dataset 1 to Training dataset N) is used to train an individual model (Model$_{indi\_1}$ to Model$_{indi\_N}$) and aggregations of the training datasets Training dataset 1 to Training dataset N are used to train the allied models Model$_{allied}$.

The training function 380 updates the model parameters for a number of epochs, until it meets the condition of converge (see the three possible converge conditions in subsection N), thereby giving rise to the trained models 382.

Once the training function 380 has finished, the data valuation module 324 runs the inference function 384, wherein the test datasets are applied to each individual model (Model$_{indi\_1}$ to Model$_{indi\_N}$) to derive a respective set of inferred or evaluated performance metrics which are combined to obtain the evaluation results (Eval results 1 to Eval results N). The test datasets are also applied to the allied models Model$_{allied}$ to derive additional performance metrics which are combined to obtain the allied evaluation results (Allied eval results).

For example, following the workflow in FIG. 9, in the local branch, the i-th individual model Model$_{indi}$ is trained by the i-th individual training dataset and is then inferred or evaluated by all test datasets (that is, inferred or evaluated on both self (local) and cross (global) client application scenarios), that is, $$\text{Score}_{indi\_i} = E_{indi\_i}(g_i(x_{test,I}|\theta_i)), x_I, I = \{1, \ldots, N\}. \quad (3)$$

In the global branch of FIG. 9, the allied models are built based on the data alliance, and the contribution from a particular dataset will also be evaluated from both local and global angles to facilitate multi-angle analysis, that is, $$\text{Score}_{allied\_i} = E_{allied\_i}(g_{allied\_i}, x_{test,I}|\theta_{A\_i})). \quad (4)$$

Then, a convex weighted summation of contributions from local and global views is used for the multi-angle overall evaluation function 366 (see FIG. 9) which combines two dimensions of alliance and two dimensions of contribution criteria, that is, $$\text{Score}_i = \alpha E_{indi\_i}(g_i(x_{test,I}|\theta_i))) + (1-\alpha)(E_{allied\_i}(g_{allied\_}(x_{test,I}|\theta_{A\_i}))), \quad (5)$$

for $\alpha \in [0, 1]$, i=1, . . . , N.

Here, $g_i(X_i|\theta_i)$, $i \in \{1, \ldots, N\}$ is the trained individual model using the training dataset from the i-th data provider 202$_i$; $X_i$, $i \in \{1, \ldots, N\}$ is the coreset of the training dataset of the i-th data provider 202$_i$. As those skilled in the art will appreciate, the number of the training datasets may be large. Therefore, instead of using the training datasets, coresets of the training datasets may be constructed (described in more details in subsection H) in the multi-angle alliance guided data valuation for reducing the computational cost.

The function items in equations (3) to (5) for the overall evaluation function 366 are explained as follows.

Score$_{indi\_i}$ or $E_{indi\_i}(g_i(x_{test,I}|\theta_i))$ is the i-th individual score corresponding to the i-th training dataset or the i-th data provider (i=1, . . . , N), which in these embodiments is the evenly weighted summation of the performance metrics of model $g_i$ across all client platforms $x_l$, that is:

$$\text{Score}_{indi\_i} = E_{indi\_i}(g_i(x_{test,I} \mid \theta_i)) = \sum_i^N \text{Metrics}_i/N, \quad (6)$$

where $\text{Metrics}_i$ represents the performance metrics of model $g_i$ on the i-th test dataset.

For the allied part, $E_{allied\_i}(g_{allied\_i} x_{test,I} \mid \theta_{A\_i}))$ is the i-th allied score $\text{Score}_{allied\_i}$ corresponding to the i-th training dataset or the i-th data provider, and may be calculated using a Shapley value method as:

$$E_{allied\_i}(g_{allied\_i}(x_{test,I} \mid \theta_{Ai})) = \\ E_{allied\_A}(g_{allied\_A}(x_{test,I} \mid \theta_A)) - E_{allied\_i}(g_{allied\_i} \\ (x_{test,I} \mid \theta_{A\backslash i})). \quad (7)$$

where A represents all possible aggregations of the N training datasets (after coreset construction), that is, any two of the N training datasets, any two of the N training datasets, . . . , and has a cardinality of M, and $$A \subseteq I = 1, \ldots, N, M \leq N. \quad (8)$$

Herein, $g_{allied\_i}(A \backslash X_i \mid \theta_{A\backslash i}), i \in \{1, \ldots, M\}$ is the trained allied model by using data from all datasets in A, excluding the dataset from the i-th data provider 202$_i$. $g_{allied\_A}(A \mid \theta_A)$ is the trained allied model from using all datasets in A. Each $E_{allied\_i}(g_{allied\_i})$ is defined as the evenly weighted summation of the performance metrics of the allied model $g_{allied\_i}$ across all client application platforms $x_{test,I}$, $I=1, \ldots, N$, i.e., $\Sigma_i^N \text{Metrics}_{allied\_i}/N$, followed by taking weighted average of this evaluation metric across all possible sets of A for data Shapley value computation wherein different subsets of A has a corresponding weight which may be related to the size of the datasets. Similarly, $E_{allied\_A}(g_{allied\_A}(x_{test,I} \mid \theta_A))$ is the evenly weighted sum of the performance metric of $g_{allied\_A}$ across all client application platforms $x_{test,I}$, $I=1, \ldots, N$, i.e., $\Sigma_i^N \text{Metrics}_{allied\_i}/N$ followed by taking weighted average of this evaluation metric across all possible sets of A.

The definition of coreset is described in in subsection H. By using the herding method (see Reference R23) for coreset construction (which guarantees stratified sampling (data distribution) and provides ease of computation (few non-trivial parameters)), a plurality of top data-points in each class are selected based on the preference from the user on how many percent would they choose to use the preview data. Generally, in each step of the iteration of the herding method, one more example of the current subset (that is, the top data-points) is added to the coreset, namely the one that causes the average feature vector over all exemplars to best approximate the average feature vector over all training examples. By using the coreset to represent the entire training datasets (as a Shapley "preconditioning"), the number of data-points that need to be processed is reduced thereby speeding up the computation and improving the efficiency of data valuation.

In some embodiments, the efficiency of data valuation may be further improved by combining coreset with other approximation methods.

Thus, with the local and global branches shown in FIG. 9, the data-valuation process may evaluate through both individual application scenarios and cross-application scenarios to reflect the bird's-eyes view of the contribution criteria.

H. Coreset Based Shapley Value Computation

In terms of the implementation of the data-valuation module 324, coreset-based Shapley value (SV) computation is used to improve the efficiency of the system 100. Herein, "coreset" is defined as follows (see Reference R22).

With a weighted set being a pair $P'=(P,w)$ where P is a set of items called points, and $w:P \to \mathbb{R}$ is a function that maps every $p \in P$ to $w(p) \in \mathbb{R}$, called the weight of p, with $\mathbb{R}$ representing the set of all real numbers, a query space is defined as:

Let x be a (possibly infinite) set called query set, $P'=P,w)$ be a weighted set called the input set, $f: P \times X \to [0,\infty)$ be called a cost function, and loss be a function that assigns a non-negative real number for every real vector. The tuple $(P, w, \mathcal{X}, f, \text{loss})$ is called a query space. For every weighted set $C'=(C, u)$ such that $C=\{c_1, \ldots, c_m\}$, and every $x \in \mathcal{X}$ we define the overall fitting error of C' to x by $$f_{loss}(C',x) := \text{loss}((w(c)f(c,x))c \in C) = \text{loss}(w(c_1) \\ f(c_1,x), \ldots, w(c_m)f(c_m,x)).$$

Then, a "coreset" is defined as:

Let $P'=(P,w)$ be a weighted set and $(P,w,X,f, \text{loss})$ be a query space. The weighted set C' is called an accurate coreset (or simply a "coreset") for $(P,w, \mathcal{X}, f, \text{loss})$ if for every $x \in \mathcal{X}$ we have $$f_{loss}(P',x) = f_{loss}(C',x).$$

The coreset-based Shapley value (SV) computation method uses coreset to represent the original (full) dataset as a Shapley "preconditioning" to significantly reduce the computational burden. Based on the observation that SV is "approximately sparse" (see Reference R3), that is, most values are concentrated around its mean and only a few data points have significant values, sparsity inspired methods can achieve $(\epsilon, \delta)$-approximation by leveraging a series of compressive sensing methods (see Reference R3). Unfortunately, these methods usually include non-trivial hyper-parameter estimation, such as the rank estimate, which influences the approximation accuracy significantly.

In these embodiments, a "coreset" may be used to represent an original training dataset and achieve the approximation via sparsity. Specifically, Herding-based coreset construction (see Reference R23) may be used, which is a deterministic approach and has simple computation logic. The benefits of using coreset for SV computation include:

By combining with the heuristic data quality assurance filtering pre-selection, coreset narrows down the number of total data points in the fused dataset D, which determines the combinatorial search space for SV, thereby resulting in significant speed-up. In embodiments where data-point-wise dataset valuation is used (that is, valuation on each data point in a dataset), when the computation using the data points in the coreset is still complex, coreset may optionally be combine d with existing approximation methods (see Reference R3). In embodiments where dataset-as-base-unit is used which already has reduced complexity of O(N (logN)$^2$) from approximating the "group testing" setting (see Reference R24), replacing the original datasets with coresets may speed up the machine-learning models' training time.

the deterministic implementation removes the randomness which may produce consistent results without having to tune non-trivial hyper-parameters.

based on the assumption that the coreset represents the closest samples to the cluster centers, the coreset-herding-construction procedure both guarantees a stratified sampling to preserve the original data distribution.

FIG. 11 shows a piece of pseudo codes of a herding algorithm (see Reference R23). As shown, in each step of the iteration of herding, one more example of the current subset is added to the coreset, namely the one that causes the average feature vector over all exemplars within a specific class to best approximate the average feature vector over all training examples for that class. The iteration ends when the coreset reaches the number of a preset number, which can be set by the users of the system, e.g. setting the coreset to have 50% of the data points in the original datasets.

I. Rank-to-Unit-Value Mapping Module

The rank-to-unit-value mapping module 326 (see FIG. 6) uses specific rules and leverages existing technologies such as those described in References R2, R6, R25, and R26.

For example, the unit-value mapping function 388 may comprise Myerson's payment function and the multiplicative weights algorithm (see Reference R15). With the unit-value mapping function 388, the rank-to-unit-value mapping module 326 receives the data value ranking results from the overall evaluation function 366, and uses incentive maximization as the data-sharing pricing algorithm's objectives to run the unit-value mapping function 388 which finally derives a list of estimated unit values (stored in the storage 390; see FIG. 6) for each individual datasets received from a plurality of data providers 202.

J. Cloud-Fueled Supermodel Growing and Sustainability

In some embodiments, the data-sharing system 100 provides cloud-fueled sustainable data sharing and model growing mechanism. In these embodiments, the data-sharing system 100 fully leverages a cloud-computing system to implement the sustainable data-sharing eco-system. Different from the limited usage of cloud-computing system in existing prior art data sharing systems, where the cloud-computing system is mostly used for storage and basic form of data fusion, the data-sharing system 100 in these embodiments utilizes cloud-computing system to facilitate data alliance for hosting and training "supermodels" for target tasks using data provided by multiple data providers. The potentials of such promising models/data products implicitly reward the data providers 202 (who also benefit from the data products in a number of cases), alongside with explicit form of immediate incentive returns. Such two-fold incentives may encourage the data providers 202 to contribute data sources in a long-term returning manner that nurtures a sustainable data-sharing eco-system.

K. Simulation 1

In the first simulation, the above-described data-sharing system 100 evaluates two data providers regarding which data provider has more contribution in performing the classification of vehicle vs. animal using their data. In this simulation, the pre-trained model is the ImageNet 1000 Resnet-18 which is a 18-layer convolutional neural network for image recognition.

The first data provider provides labelled images with labels of "dog", "cat", "automobile", and "truck", selected from CIFAR-10 dataset with 20,000 CIFAR-10 images for training and 4,000 CIFAR-10 images for testing. As those skilled in the art understand, CIFAR-10 is Canadian Institute for Advanced Research (CIFAR) collection of images in 10 classes (with 6000 images per class) commonly used to train machine learning and computer vision algorithms.

The second data provider provides labelled images with labels of "wolf", "lion", "tiger", "leopard", "fox", "bus", "pickup truck", "train", "tractor", and "streetcar", selected from CIFAR-100 dataset with 5,000 CIFAR-100 images for training and 1,000 CIFAR-100 images for testing. Similar to CIFAR-10, CIFAR-100 is a collection of images in 100 classes (with 600 images per class) also commonly used to train machine learning and computer vision algorithms.

In this simulation, 10% training is considered as the validation set, the supermodel is the pre-trained model trained from ImageNet 1000 dataset, and E=0.5 (see subsection G and FIG. 9).

Step 1: Data Setup

As described above, the simulation uses data from CIFAR10 and CIFAR100 which contain natural image information. In the simulation, the target task is a 2-way classification between vehicle and animal.

The input feature dimension of each sample is 32×32 color image. Both the training dataset and the test dataset have been taken from the superclass (vehicle vs. animal) from two datasets respectively. 10% of the training samples have been used as the validation dataset.

As described above, the first data provider has 20,000 training samples and 4,000 testing samples from—[['automobile', 'truck'], ['dog', 'cat']] in CIFAR10. The second data provider has 5,000 training samples and 1,000 testing samples from [['streetcar', 'pickup_truck', 'bus', 'train', 'tractor'], ['wolf', 'fox', 'lion', 'tiger', 'leopard']] in CIFAR100.

The simulation uses a pre-trained ImageNet 1000 Resnet-18 model to simulate an existing supermodel held by the cloud cloud-computing system 306, and a randomly initialized model to simulate the condition where the supermodel just started being built from scratch.

Training/test dataset volume between the two data providers is, in original incoming data, the first data provider has 4 times volume in training and test data than the second data provider. Fine-grained level stratified down-sampling is used to simulate different ratios of total training/test data volume between the two data providers.

Step 2: Task and Module Setup

The task is to evaluate which one of the two data providers has more contribution in performing the classification of vehicle vs. animal using their data. In this simulation, the data-quality assurance step is skipped since images have shown to have good quality. The machine-learning route (that is, the AI model performance comparison route 506) is used to demonstrate the data-sharing system 100.

Step 3: Training and Prediction and Evaluation

The following training protocol is used: in training the models, Model_1 was trained from dataset 1, Model_2 was trained from dataset 2, and Model_3 was trained from the combination of datasets 1 and 2, Model_base is the pre-trained model or the randomly initialized model.

The simulation uses the trained models to perform prediction following the prediction protocol. Model_base, Model_1, Model_2 and Model_3 were evaluated on test dataset 1 and test dataset 2, and the metrics were averaged through all test datasets.

In the calculation, $\alpha=0.5$ is used in performing the overall evaluation, and $$evalScore1 = \alpha[(\text{score}_{model\_1} - \text{score}_{model\_base})] +$$

$$(1 - \alpha)\left[\frac{1}{2}(\text{score}_{model\_1} - \text{score}_{model\_base}) + \right.$$

-continued $$\frac{1}{2}(\text{score}_{model\_3} - \text{score}_{model\_2})\Big],$$

$$evalScore2 = \alpha[(\text{score}_{model\_2} - \text{score}_{model\_base})] +$$

$$(1-\alpha)\Big[\frac{1}{2}(\text{score}_{model\_2} - \text{score}_{model\_base}) +$$

$$\frac{1}{2}(\text{score}_{model\_3} - \text{score}_{model\_1})\Big].$$

With respect to simulation settings, training hyper-parameters include:

Batch size: 128;

Inner training epochs: 350; Outer iterations: 2 individual+1 allied model;

Optimizer: Stochastic gradient descent (SGD) with momentum=0.9 and weight decay=5e-4;

Learning rate (LR) scheduler: step-wise drop LR by 0.1; step size: 80;

Starting LR: 0.01 when using pre-trained model and 0.1 when without the pre-trained model;

The comparison of scenarios includes:

Applying the existing "supermodel" without using any new data;

Applying random initialized model for training from scratch;

Training and evaluate with the first data provider holding 4 times of the second data provider;

Balancing the test dataset volumes between the two data providers;

Balancing both the training and test dataset volumes between two sources.

Simulation results are shown in Table 1 below.

TABLE 1

Simulation Results
Testing accuracy marginal change in X %

| With pre-trained (with supermodel) | First Data Provider | Second Data Provider |
| --- | --- | --- |
| As it is | 7.45375 | 5.22875 |
| Balance the test set | 6.725 | 5.01 |
| Balance both train and test set | 6.8925 | 5.1525 |
| Random predictor (wo supermodel) | Data 1 | Data 2 |
| As it is | 37.09 | 32.28 |
| Balance the test set | 36.12875 | 32.275 |
| Balance both train and test set | 32.985 | 33.255 |

Thus, this simulation shows that:

Adding either data source improves the model performance in the target task (cloud-fueled system supports to boost the data product as the relevant data grows);

Overall, data from the first data provider is more valuable than that from the second data provider, but not the same as volume difference.

L. Simulation 2

Figure 12:
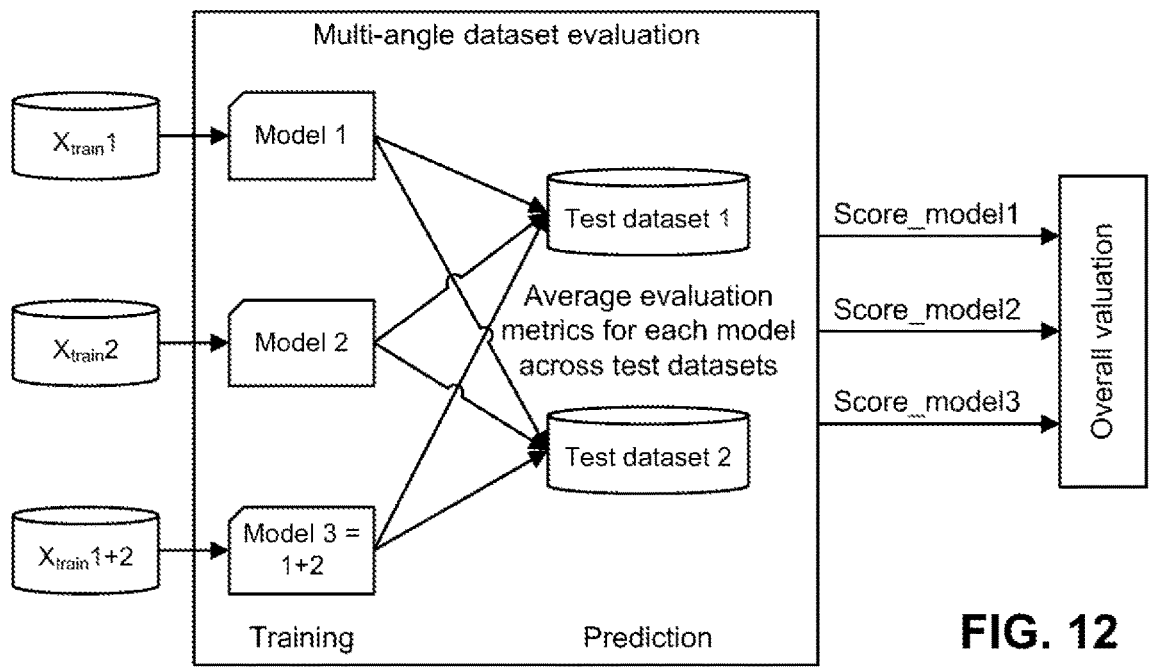
FIG. 12 shows the dataflow of the data-sharing system shown in FIG. 6 in a simulation.

In this simulation, data from two companies, Company 1 and Company 2, are used for evaluating which dataset of the two companies has more contribution in improving the performance of a content moderation model which is used in content review for detecting and flagging specific content such as pornography. The dataflow is shown in FIG. 12.

Step 1: Data Setup

Training dataset 1 and test dataset 1 from Company 1 each include 80,000 data points selected from a database of Company 1 comprising 8 million data points.

Training dataset 2 and test dataset 2 from Company 2 each include 80,000 data points selected from a database of Company 2 comprising 5 million data points (stratified sampling: 1.6%).

Step 2: Task and AI Model Setup

The task is to evaluate which one of the datasets of the two companies has more contribution in improving the performance of a content moderation model at inference (e.g. an AI model which performs image classification to classify images into one of three classes: normal, porn, and sexy).

In this simulation, a customized data-quality assurance module 322 is used. The machine-learning route (that is, the AI model performance comparison route 506) is used to demonstrate the data-sharing system 100.

Step 3: Training and Prediction and Evaluation of the AI Model which Performs Image Classification The following training protocol is used in training the models: Model_1 was trained using dataset 1 and a machine learning algorithm, Model_2 was trained using dataset 2 and the same machine learning algorithm, and Model_3 was trained using a training dataset that is the result of the combination of datasets 1 and 2 and the same machine learning algorithm.

The simulation uses the three trained models to evaluate the performance of each of the trained models at inference. At inference, test dataset 1 is used to evaluate trained Model_1, test dataset 2 is used to evaluate trained Model_2 and test dataset 3 is used to evaluate trained Model_3 which each respectively, generate a set of predicted outcomes. The set of predicted outcomes generated by each respective rained models is evaluated to obtain a performance for the trained model at inference.

In the calculation, α=0.5 is used in performing the overall evaluation, and $$evalScore1 = \alpha[(\text{score}_{model\_1} - \text{score}_{model\_base})] +$$

$$(1-\alpha)\Big[\frac{1}{2}(\text{score}_{model\_1} - \text{score}_{model\_base}) +$$

$$\frac{1}{2}(\text{score}_{model\_3} - \text{score}_{model\_2})\Big],$$

$$evalScore2 = \alpha[(\text{score}_{model\_2} - \text{score}_{model\_base})] +$$

$$(1-\alpha)\Big[\frac{1}{2}(\text{score}_{model\_2} - \text{score}_{model\_base}) +$$

$$\frac{1}{2}(\text{score}_{model\_3} - \text{score}_{model\_1})\Big].$$

Figure 13:
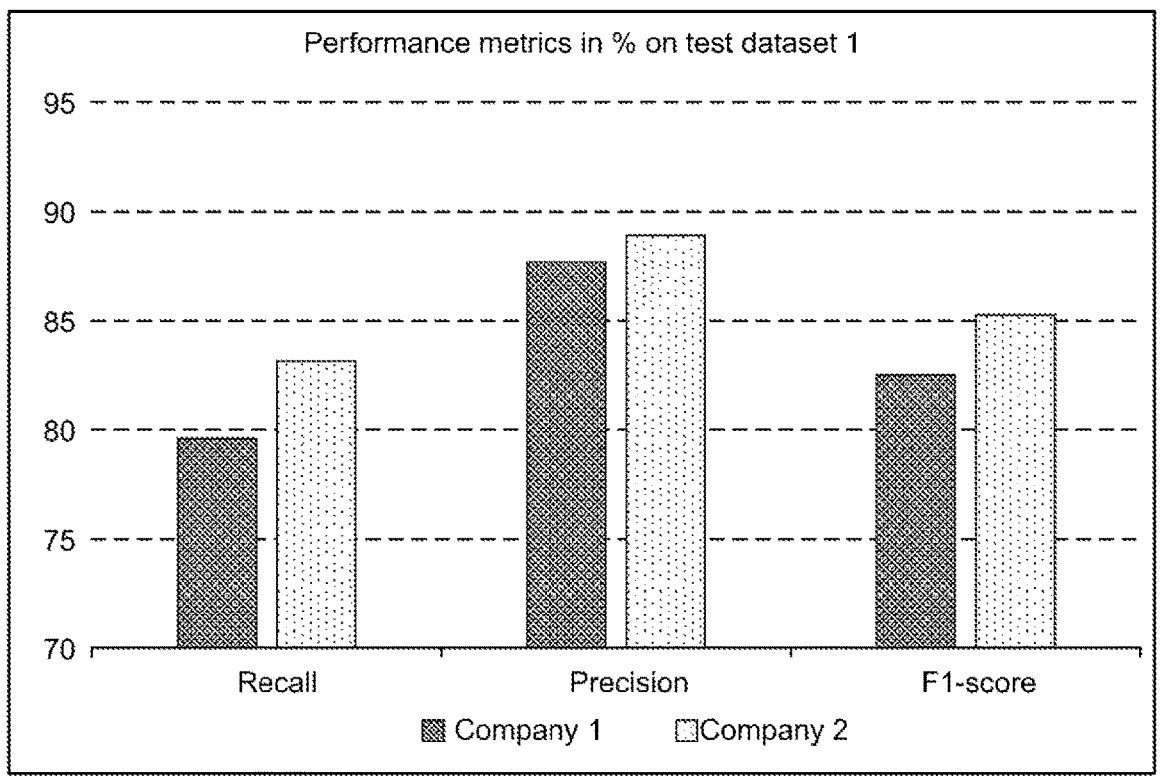
FIGS. 13 to 15 show the simulation results of the data-sharing system shown in FIG. 6.
Figure 14:
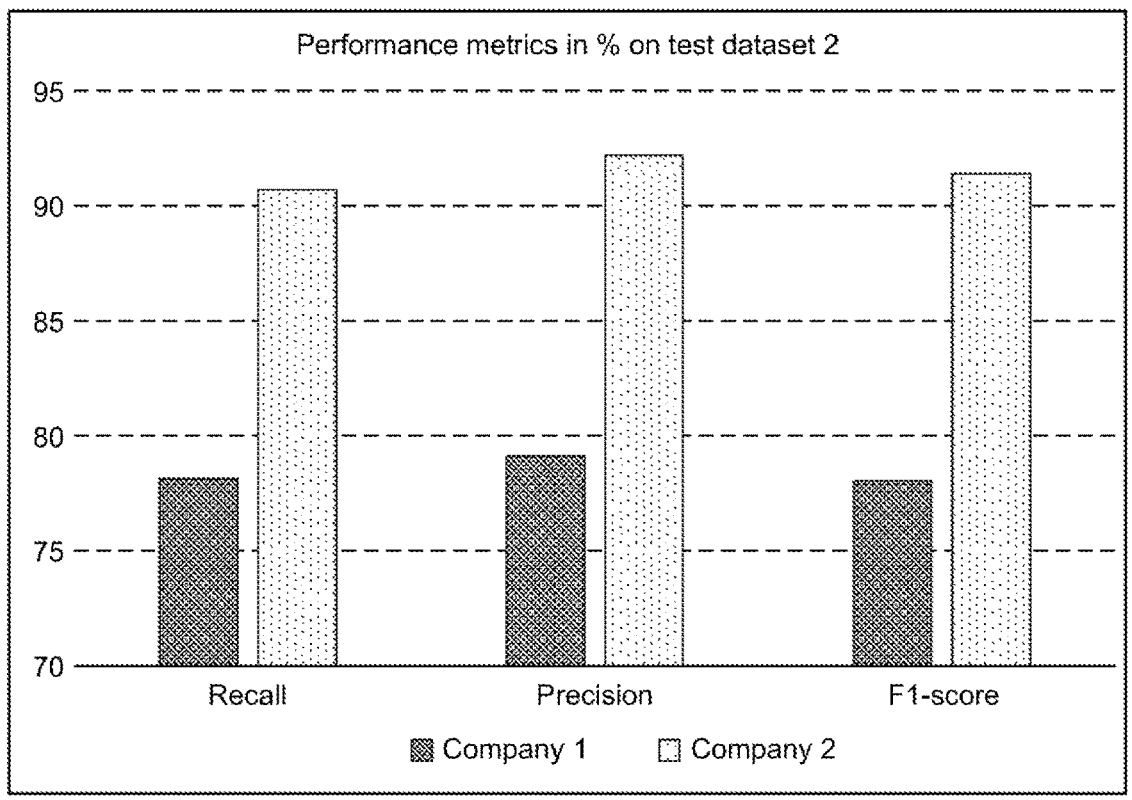
Figure 15:
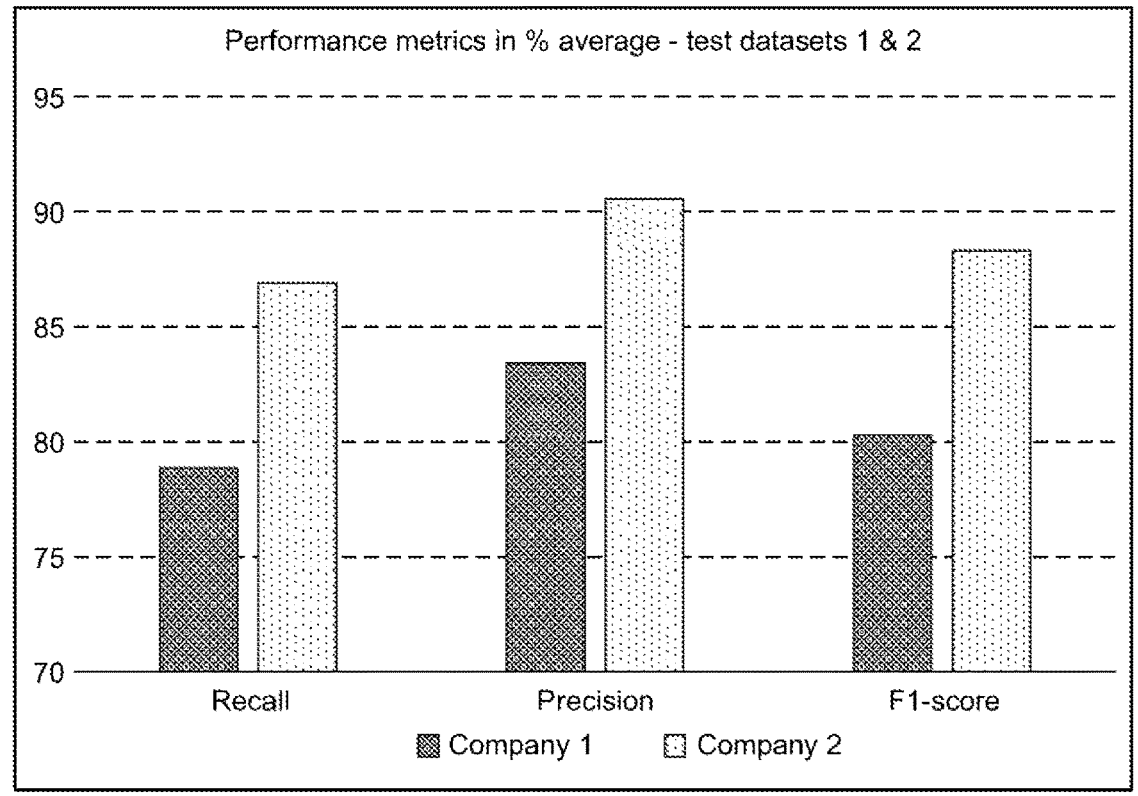

Simulation results are shown in FIGS. 13 to 15, wherein FIG. 13 shows the mean classification results over 3 classes on the test dataset 1 which is the scenario of Company 1, FIG. 14 shows the mean classification results over 3 classes on the test dataset 2 which is the scenario of Company 2, and FIG. 15 shows the average of metrics on the mean classification results over 3 classes on the test datasets 1 and 2. As can be seen from FIGS. 13 to 15, dataset of Company 2 contributes more in improving the model's performance of detection specific contents, from evaluation metrics including Recall, Precision, and F1-score.

M. Other Fields for Using the System and Method Disclosed Herein

While the above description describes a data-sharing system and method with data valuation, the system and method disclosed herein may alternatively be used in federated learning wherein the data owner may have strong need of privacy.

Those skilled in the art will appreciate that the system and method disclosed herein may be used in other fields such as:
Valuation driven data-product pricing;
Mixed commodities pricing with valuation for data and data product combination; and
Other fields such as data purchase suggestion, data summarization, corrupted data detection, fairness analysis using valuation.

N. Definitions

"Digital products" refers to the products that may be consumed through electronic devices, such as e-books, downloadable musics, and internet coupons.

"Data products" refers to datasets as products and information derived from datasets.

"Digital information goods" refers to both digital products and data products.

"Data market" refers to a data-sharing system or "market" where participants trade data or digital information goods in general.

"Data provider" refers to a user of the data-sharing system who owns data and participates in sharing data in the data-sharing system; also denoted "data owner".

"Data consumer" refers to a user of the data-sharing system who acquires or being shared with data and/or information service (for example, AI models trained by datasets) available in the data-sharing system.

"Arbiter" refers to a module of the data-sharing system which evaluates and integrates data from the data providers, and provides data fusion or information service products (such as AI models) to the data consumers.

"Data valuation" refers to evaluation of the value of data as an asset in data-sharing.

"Incentive allocation" refers to a module of the data-sharing system (such as the arbiter) who evaluates contributions of each of a plurality of data providers, and distributes incentives among the plurality of data providers using an incentive-splitting mechanism.

"Data alliance" refers to the combination of a plurality of data sources wherein data therefrom are integrated and fused for improving data products.

"Cloud-computing system" refers to interconnected hardware and software resources that are accessible by users, where data and data products (for example, AI models) may be stored, trained, shared, and queried for usage.

"Client application" refers to an application environment that the data consumers may acquire a trained AI model or query a service of a cloud-computing system which provides trained AI model which performs a target task.

"Multi-Angle CVIA: Multi-Angle Cloud-fueled and Data Valuation-driven Incentive Allocation, that is, the name of data-sharing system of the present invention.

"Training an AI model" refers to a computer-executed process of obtaining a pre-trained model (i.e. an AI model with learned parameters if available) and a task definition, and training the AI model using the data provided and a machine learning algorithm.

"Inference" refers to a computer-executed process in which a trained AI model (that is, a trained AI model which performs a given task wherein the parameters of the AI model have been learned using a training dataset and a machine learning algorithm) is provided with new data and the trained AI model generates a prediction based on the new data. The prediction may be, if the trained AI model is for object detection, a class label for each object in an image input to the trained model, a probability value for each object is a class in an image input to the trained model, a bounding box for each object in an image input to the trained model, and/or the like.

"Iteration process" refers to a process executing operations with a plurality of iterations, wherein one iteration is one operation of computing the gradients of the loss function in terms of the parameters of an AI model; for each iteration, the parameters of the AI model are updated by computing the average gradients of individually computed results on each training data sample of a training dataset.

"Initialization" refers to the start of an iteration process.

"Converge" refers to the termination of an iteration process.

"Condition of convergence" refers to the condition on which an iteration process may terminate; the condition of convergence may be, but not limited to, either one or more of the following conditions: (a) the number of iterations exceeding a maximum number of iterations specified by the user; (b) the change of the value of defined loss function outputs between previous and current iterations being smaller than a user-specified threshold; and (c) the L2-norm of the gradient of the loss function in regards to the model weights for averaged training samples in a training dataset being smaller than a user specified threshold.

"Coreset": a coreset of an input set is defined as "its small summation, such that solving a problem on the coreset as its input, provably yields the same result as solving the same problem on the original (full) set, for a given family of problems (models, classifiers, loss functions)"; see Reference R22; also see Reference R23.

O. References

The following are the references cited in the description above. The content of each of these references is incorporated herein by reference in its entirety.

(R1) Jian Pei. "A Survey on Data Pricing: from Economics to Data Science." arXiv preprint arXiv:2009.04462 (2020).

(R2) Raul Castro Fernandez, Pranav Subramaniam, And Michael J. Franklin. "Data market platforms: Trading data assets to solve data problems." Proceedings of the VLDB Endowment 13.12 (2020): 1933-1947.

(R3) Ruoxi Jia, et al. "Towards efficient data valuation based on the shapley value." arXiv preprint arXiv:1902.10275 (2020 August).

(R4) Yu, Haifei, and Mengxiao Zhang. "Data pricing strategy based on data quality." Computers & Industrial Engineering 112 (2017): 1-10.

(R5) Judd Randolph Heckman et al. "A pricing model for data markets." iConference 2015 Proceedings (2015).

(R6) Jian Yang, Chongchong Zhao, and Chunxiao Xing. "Big data market optimization pricing model based on data quality." Complexity 2019 (2019).

(R7) Lloyd S. Shapley. "A value for n-person games." Contributions to the Theory of Games 2, no. 28 (1953): 307-317.

(R8) Pradeep Dubey. "On the uniqueness of the Shapley value." International Journal of Game Theory 4, no. 3 (1975): 131-139.

(R9) Amirata Ghorbani, and James Zou. "Data shapley: Equitable valuation of data for machine learning." arXiv preprint arXiv:1904.02868 (2019).

(R10) Pang Wei Koh, and Percy Liang. "Understanding black-box predictions via influence functions." arXiv preprint arXiv:1703.04730 (2017).

(R11) Sanjit A. Seshia, Ankush Desai, Tommaso Dreossi, Daniel J. Fremont, Shromona Ghosh, Edward Kim, Sumukh Shivakumar, Marcell Vazquez-Chanlatte, and Xiangyu Yue. "Formal specification for deep neural networks." In International Symposium on Automated Technology for Verification and Analysis, pp. 20-34. Springer, Cham, 2018.

(R12) Venkat Gudivada, Amy Apon, and Junhua Ding. "Data quality considerations for big data and machine learning: Going beyond data cleaning and transformations." International Journal on Advances in Software 10.1 (2017): 1-20.

(R13) IBM autoAI playground: https://autoai.mybluemix.net/home (R14) Ulrik Brandes, Daniel Delling, Marco Gaertler, Robert Gorke, Martin Hoefer, Zoran Nikoloski, and Dorothea Wagner. "On finding graph clusterings with maximum modularity." In International Workshop on Graph-Theoretic Concepts in Computer Science, pp. 121-132. Springer, Berlin, Heidelberg, 2007.

(R15) S. Aranganayagi, and K. Thangavel. "Clustering categorical data using silhouette coefficient as a relocating measure." In International Conference on Computational Intelligence and Multimedia Applications (ICCIMA 2007), vol. 2, pp. 13-17. IEEE, 2007.

(R16) Dunn, Joseph C. "A fuzzy relative of the ISODATA process and its use in detecting compact well-separated clusters." (1973): 32-57.

(R17) Chen Sun, Abhinav Shrivastava, Saurabh Singh, and Abhinav Gupta. "Revisiting unreasonable effectiveness of data in deep learning era." In Proceedings of the IEEE international conference on computer vision, pp. 843-852. 2017.

(R18) Melissa A Schilling. "Understanding the alliance data." Strategic Management Journal 30, no. 3 (2009): 233-260.

(R19) Francine Berman, and Merce Crosas. "The research data alliance: Benefits and challenges of building a community organization." Harvard Data Science Review 2, no. 1 (2020).

(R20) Dario Amodei, Chris Olah, Jacob Steinhardt, Paul Christiano, John Schulman, and Dan Mané. "Concrete problems in AI safety." arXiv preprint arXiv:1606.06565 (2016).

(R21) Ching-Yao Chuang, Antonio Torralba, and Stefanie Jegelka. "Estimating generalization under distribution shifts via domain-invariant representations." arXiv preprint arXiv:2007.03511 (2020).

(R22) Ibrahim Jubran, Alaa Maalouf, and Dan Feldman. "Introduction to coresets: Accurate coresets." arXiv preprint arXiv:1910.08707 (2019).

(R23) Max Welling. "Herding dynamical weights to learn." Proceedings of the 26th Annual International Conference on Machine Learning. 2009.

(R24) Dingzhu Du, Frank K. Hwang, and Frank Hwang. "Combinatorial group testing and its applications." Vol. 12. World Scientific, 2000.

(R25) Chaolun Xia, and Shanmugavelayutham Muthukrishnan. "Arbitrage-free pricing in user-based markets." In Proceedings of the 17th International Conference on Autonomous Agents and MultiAgent Systems, pp. 327-335. 2018.

(R26) Agarwal A, Dahleh M, Sarkar T. "A marketplace for data: An algorithmic solution." InProceedings of the 2019 ACM Conference on Economics and Computation 2019 Jun. 17 (pp. 701-726).

Although embodiments have been described above with reference to the accompanying drawings, those of skill in the art will appreciate that variations and modifications may be made without departing from the scope thereof as defined by the appended claims.

What is claimed is:

1. A data sharing system for sharing data from one or more data providers to one or more data consumers, the data comprising one or more input datasets each provided by a respective one of the one or more data providers, the data sharing system comprising:
    one or more processing structures; and
    memory storing instructions which, when executed by the one or more processing structures, cause the one or more processing structures to perform actions comprising:
        obtaining one or more training datasets from the one or more input datasets, each of the one or more training datasets corresponding to a respective one of the one or more input datasets;
        evaluating the one or more training datasets for generating one or more quality scores, each quality score associated with a respective one of the one or more training datasets;
        generating a unit value for each of the one or more input datasets based on the one or more quality scores;
        receiving incentives from the one or more data consumers for acquiring at least a portion of the input datasets;
        distributing the received incentives to the one or more data providers based on the one or more unit values and the at least portion of the input datasets; and
        sharing the at least portion of the input datasets with the one or more data consumers;
    wherein said evaluating the one or more training datasets comprises: evaluating the one or more training datasets using a first evaluation method comprising:
        training an artificial intelligence AI model using the one or more training datasets and a machine learning algorithm to obtain one or more first trained models, and
        generating each of the one or more quality scores based on one or more first predictions generated by a corresponding one of the one or more first trained models using one or more test datasets received from the one or more data consumers.

2. The data sharing system of claim 1, wherein said generating each of the one or more quality scores comprises:
    calculating one or more first performance metrics based on the one or more first predictions generated by the corresponding one of the one or more first trained models using the one or more test datasets, each of the one or more first performance metrics corresponding to a respective one of the one or more test datasets;
calculating a first score for the corresponding one of the one or more first trained models, the first score being a weighted summation of the one or more first performance metrics; and
calculating the one or more quality scores using at least one or more first scores.

3. The data sharing system of claim 1, wherein said evaluating the one or more training datasets comprises:
aggregating different subsets of the one or more training datasets to form a plurality of aggregated training datasets;
training the AI model using the aggregated training datasets to obtain a plurality of second trained models; and
generating each of the one or more quality scores based on the one or more first predictions generated by the corresponding one of the one or more first trained models using the one or more test datasets and a plurality of second predictions generated by the second trained models using the one or more test datasets.

4. The data sharing system of claim 3, wherein said generating each of the one or more quality scores comprises:
calculating one or more first performance metrics based on the one or more first predictions generated by the corresponding one of the one or more first trained models using the one or more test datasets, each of the one or more first performance metrics corresponding to a respective one of the one or more test datasets;
calculating a first score for the corresponding one of the one or more first trained models, the first score being a weighted summation of the one or more first performance metrics;
calculating a plurality of second performance metrics based on the second predictions generated by the second trained models using the one or more test datasets, for each of the second trained models, each of the second performance metrics corresponding to a respective one of the one or more test datasets;
combining the second performance metrics to produce a second score for each of the one or more training datasets; and
calculating each of the one or more quality scores as weighted summation of a corresponding one of the first score and a corresponding one of the second score.

5. The data sharing system of claim 4, wherein said calculating the plurality of second performance metrics comprises:
calculating the plurality of second performance metrics using a Shapley value method based on the second predictions generated by the second trained models using the one or more test datasets, for each of the second trained models.

6. The data sharing system of claim 1, wherein said generating the unit value for each of the one or more input datasets based on the one or more quality scores comprises:
ranking the one or more quality scores; and
producing the one or more unit values for the one or more input datasets based on the ranking.

7. The data sharing system of claim 1, wherein the instructions, when executed by the one or more processing structures, cause the one or more processing structures to perform further actions comprising:
receiving one or more raw input datasets from the one or more data providers; and
wherein said obtaining the one or more training datasets from the one or more input datasets comprises:
filtering the one or more raw input datasets to obtain the one or more training datasets.

8. The data sharing system of claim 1, wherein said obtaining the one or more training datasets from the one or more input datasets comprises:
constructing a coreset from each of the one or more input datasets to obtain the one or more training datasets.

9. The data sharing system of claim 8, wherein said constructing the coreset from each of the one or more input datasets comprises:
constructing the coreset from each of the one or more input datasets using a herding method.

10. The data sharing system of claim 1, wherein said evaluating the one or more training datasets comprises:
evaluating the one or more training datasets using a plurality of evaluation methods, the plurality of evaluation methods comprising the first evaluation method; and
wherein the instructions, when executed by the one or more processing structures, cause the one or more processing structures to perform further actions comprising:
selecting the first evaluation method when an input from the one or more data consumers comprises one or more task definitions associated with a target task and the one or more test datasets are associated with the target task.

11. The data sharing system of claim 10, wherein the plurality of evaluation methods comprise a second evaluation method, the second evaluation method comprising:
an automated clustering function for estimating clusterability of the one or more training datasets, clustering the one or more training datasets, and estimating a number of clusters, and
a clustering evaluation function for computing clustering outcome metrics to measure intra-class and inter-class relationships of the clusters and to generate the one or more quality scores;
wherein the instructions, when executed by the one or more processing structures, cause the one or more processing structures to perform further actions comprising:
selecting the second evaluation method when the input from the one or more data consumers comprises no task definitions.

12. The data sharing system of claim 11, wherein the intra-class and inter-class relationships of the clusters comprise one or more of modularity, silhouette coefficient, Dunn index, and Davies-Bouldin index.

13. The data sharing system of claim 11, wherein the plurality of evaluation methods comprise a third evaluation method, the third evaluation method comprising:
a statistics extraction function for extracting statistics of the one or more training datasets with respect to one or more features thereof, and
a statistics score computation function for using the extracted statistics to generate the one or more quality scores;
wherein the instructions, when executed by the one or more processing structures, cause the one or more processing structures to perform further actions comprising:
selecting the third evaluation method when the one or more input datasets are associated with a first task, the input from the one or more data consumers comprises the one or more task definitions associated with the target task, and the first task matches the target task.

14. The data sharing system of claim 13, wherein the one or more features comprise one or more of volume, distribution, and image quality metrics.

15. The data sharing system of claim 14, wherein each of the one or more quality scores is calculated as a weighted sum of the volume, the distribution, and the image quality metrics, with a summation of weights of the volume, the distribution, and the image quality metrics equals to one.

16. The data sharing system of claim 1 further comprising:
a computer cloud for maintaining an AI supermodel for use in said evaluating the one or more training datasets for generating the one or more quality scores, the AI supermodel being trained using the one or more training datasets and other training datasets provided by other data providers.

17. A computerized method for sharing data from one or more data providers to one or more data consumers, the data comprising one or more input datasets each provided by a respective one of the one or more data providers, the method comprising:
obtaining one or more training datasets from the one or more input datasets, each of the one or more training datasets corresponding to a respective one of the one or more input datasets;
evaluating the one or more training datasets for generating one or more quality scores, each quality score associated with a respective one of the one or more training datasets;
generating a unit value for each of the one or more input datasets based on the one or more quality scores;
receiving incentives from the one or more data consumers for acquiring at least a portion of the input datasets;
distributing the received incentives to the one or more data providers based on the one or more unit values and the at least portion of the input datasets; and
sharing the at least portion of the input datasets with the one or more data consumers;
wherein said evaluating the one or more training datasets comprises: evaluating the one or more training datasets using a first evaluation method comprising:
training an artificial intelligence AI model using the one or more training datasets and a machine learning algorithm to obtain one or more first trained models, and
generating each of the one or more quality scores based on one or more first predictions generated by a corresponding one of the one or more first trained models using one or more test datasets received from the one or more data consumers.

18. The computerized method of claim 17, wherein said generating each of the one or more quality scores comprises:
calculating one or more first performance metrics based on the one or more first predictions generated by the corresponding one of the one or more first trained models using the one or more test datasets, each of the one or more first performance metrics corresponding to a respective one of the one or more test datasets;
calculating a first score for the corresponding one of the one or more first trained models, the first score being a weighted summation of the one or more first performance metrics; and
calculating the one or more quality scores using at least one or more first scores.

19. The computerized method of claim 17, wherein said evaluating the one or more training datasets comprises:
aggregating different subsets of the one or more training datasets to form a plurality of aggregated training datasets;
training the AI model using the aggregated training datasets to obtain a plurality of second trained models; and
generating each of the one or more quality scores based on the one or more first predictions generated by the corresponding one of the one or more first trained models using the one or more test datasets and a plurality of second predictions generated by the second trained models using the one or more test datasets.

20. The computerized method of claim 17, wherein said obtaining the one or more training datasets from the one or more input datasets comprises:
constructing a coreset from each of the one or more input datasets to obtain the one or more training datasets.

21. The computerized method of claim 17, wherein said evaluating the one or more training datasets comprises:
evaluating the one or more training datasets using a plurality of evaluation methods, the plurality of evaluation methods comprising the first evaluation method; and
wherein the computerized method further comprises:
selecting the first evaluation method when an input from the one or more data consumers comprises one or more task definitions associated with a target task and the one or more test datasets are associated with the target task.

22. One or more non-transitory computer-readable storage devices comprising computer-executable instructions for sharing data from one or more data providers to one or more data consumers, the data comprising one or more input datasets each provided by a respective one of the one or more data providers, wherein the instructions, when executed, cause one or more processors to perform actions comprising:
obtaining one or more training datasets from the one or more input datasets, each of the one or more training datasets corresponding to a respective one of the one or more input datasets;
evaluating the one or more training datasets for generating one or more quality scores, each quality score associated with a respective one of the one or more training datasets;
generating a unit value for each of the one or more input datasets based on the one or more quality scores;
receiving incentives from the one or more data consumers for acquiring at least a portion of the input datasets;
distributing the received incentives to the one or more data providers based on the one or more unit values and the at least portion of the input datasets; and
sharing the at least portion of the input datasets with the one or more data consumers;
wherein said evaluating the one or more training datasets comprises: evaluating the one or more training datasets using a first evaluation method comprising:
training an artificial intelligence AI model using the one or more training datasets and a machine learning algorithm to obtain one or more first trained models, and
generating each of the one or more quality scores based on one or more first predictions generated by a corresponding one of the one or more first trained models using one or more test datasets received from the one or more data consumers.

23. The one or more non-transitory computer-readable storage devices of claim 22, wherein said generating each of the one or more quality scores comprises:

calculating one or more first performance metrics based on the one or more first predictions generated by the corresponding one of the one or more first trained models using the one or more test datasets, each of the one or more first performance metrics corresponding to a respective one of the one or more test datasets;

calculating a first score for the corresponding one of the one or more first trained models, the first score being a weighted summation of the one or more first performance metrics; and calculating the one or more quality scores using at least one or more first scores.

\* \* \* \* \*